US012283976B1

United States Patent
Köse et al.

(10) Patent No.: US 12,283,976 B1
(45) Date of Patent: Apr. 22, 2025

(54) SOFTWARE-DEFINED COGNITIVE NETWORKING FOR WIRELESS COMMUNICATIONS

(71) Applicant: TrellisWare Technologies, Inc., San Diego, CA (US)

(72) Inventors: Cenk Köse, San Diego, CA (US); Louise Borrelli, San Diego, CA (US); Yong James Lee, San Diego, CA (US); Mark Johnson, San Diego, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 417 days.

(21) Appl. No.: 17/942,848

(22) Filed: Sep. 12, 2022

Related U.S. Application Data

(60) Provisional application No. 63/242,991, filed on Sep. 10, 2021.

(51) Int. Cl.
*H04B 1/40* (2015.01)
*H04B 1/00* (2006.01)
*H04B 1/10* (2006.01)
*H04W 24/02* (2009.01)

(52) U.S. Cl.
CPC ............. *H04B 1/0003* (2013.01); *H04B 1/10* (2013.01); *H04W 24/02* (2013.01)

(58) Field of Classification Search
CPC ............................. H04B 1/0003; H04B 1/406
See application file for complete search history.

(56) References Cited

PUBLICATIONS

Security Aspects in Sofware Defined Radio and Cognitive Radio Networks: A Survey and a Way Ahead; 2012; from Applicant's IDS hereinafter NPL (Year: 2012).*
Baldini et al., "Security Aspects in Software Defined Radio and Cognitive Radio Networks: A Survey and a Way Ahead," IEEE Communications Surveys & Tutorials 14(2):355-379 (Second Quarter 2012).

* cited by examiner

*Primary Examiner* — Melvin C Marcelo
*Assistant Examiner* — Natali Pascual Peguero
(74) *Attorney, Agent, or Firm* — Perkins Coie LLP

(57) ABSTRACT

Devices, systems, and methods for software-defined cognitive networking for wireless communications are provided. An example method of wireless communication includes performing, at a first node of a plurality of nodes, multiple network interference measurements to generate a first local interference model, receiving, from a second node of the plurality of nodes, a second local interference model, combining, at the first node, the first local interference model and the second local interference model to generate a joint interference model, generating, based on the joint interference model, a plurality of interference parameters that characterize a communication channel between the first node and the second node, selecting, based on the plurality of interference parameters, an operating waveform from a plurality of waveforms such that a performance metric for a data communication from the first node to the second node exceeds a threshold, and performing, using the operating waveform, the data communication.

20 Claims, 18 Drawing Sheets

SOFTWARE-DEFINED COGNITIVE NETWORKING FOR WIRELESS COMMUNICATIONS

CROSS-REFERENCE TO RELATED APPLICATION

This application claims priority to U.S. Provisional Application 63/242,991 filed on Sep. 10, 2022, the disclosure of which is hereby incorporated by reference herein in its entirety.

TECHNICAL FIELD

This document generally relates to wireless networks, and more specifically, to automatically identifying performance degradation in the wireless networks and adapting rules and/or policies to mitigate the deleterious effects.

BACKGROUND

Wireless communications systems often need to operate in congested and contested radio frequency (RF) environments. It is desirable to provide efficient technical solutions for maintaining communications, in increasingly complex RF environments, at machine-speed timelines without operator intervention. Communications systems must autonomously provide adaptation appropriate for global operations in permissive, semi-permissive and restricted environments.

SUMMARY

Embodiments of the disclosed technology are directed to software-defined cognitive networking (SDCN) techniques that advantageously enable communication amongst multiple nodes in a mobile ad-hoc network (MANET) to be maintained in congested and contested radio frequency (RF) environments. In an example, this is achieved by generating a set of observables, which are representative of the communication channels in the MANET, determining a set of features that are associated with a data communication over the channels, and using a waveform- or transport-agnostic decision engine to determine an appropriate transport or waveform to perform the subsequent communications.

In an example, a method of wireless communication includes performing, by a first node of a plurality of nodes, a plurality of network interference measurements to generate a first local interference model, receiving, from a second node of the plurality of nodes, a second local interference model, combining the first local interference model and the second local interference model to generate a joint interference model, generating, based on the joint interference model, a plurality of interference parameters, wherein the plurality of interference parameters characterize a communication channel between the first node and the second node, selecting, based on the plurality of interference parameters, an operating waveform from a plurality of waveforms such that a performance metric for a data communication from the first node to the second node exceeds a threshold, performing, using the operating waveform, the data communication.

In another example, a method for wireless communication includes performing a plurality of sensing measurements, generating, based on the plurality of sensing measurements, a plurality of network parameters that characterize a communication channel between the first wireless device and a second wireless device of the plurality of wireless devices, determining, based on the plurality of network parameters, a plurality of features representative of a data communication between the first wireless device and the second wireless device using a plurality of waveforms, generating, based on the plurality of features, a plurality of scores, wherein each of the plurality of scores is associated with a corresponding waveform of the plurality of waveforms, selecting, based on the plurality of scores, an operating waveform from the plurality of waveforms, wherein the operating waveform corresponds to a maximum score from the plurality of scores, performing, using the operating waveform, the data communication over the communication channel.

In yet another example, a method for wireless communication includes generating a first set of synthetic sensing measurements, performing a sensing operation to generate a second set of sensing measurements, performing, based on the first set of synthetic sensing measurements and the second set of sensing measurements, an offline training operation, performing the sensing operation to generate a third set of sensing measurements, generating, based on the third set of sensing measurements, a plurality of network and interference parameters that characterize a communication channel between the apparatus and another apparatus, determining, based on the plurality of network and interference parameters, a plurality of features representative of a data communication between the apparatus and the another apparatus using a plurality of waveforms, configuring, based on an output of the offline training operation, a machine learning (ML) model to use an operating topology, generating, based on the plurality of features and using the ML model, a plurality of scores, wherein each of the plurality of scores is associated with a corresponding waveform of the plurality of waveforms, selecting, based on the plurality of scores, an operating waveform from the plurality of waveforms, wherein the operating waveform corresponds to a maximum score from the plurality of scores, performing, using the operating waveform, the data communication over the communication channel.

In yet another example, the above-described method is embodied in the form of processor-executable code and stored in a computer-readable program medium.

In yet another example, a device that is configured or operable to perform the above-described method is disclosed.

The above examples and other aspects and their implementations are described in greater detail in the drawings, the descriptions, and the claims.

DETAILED DESCRIPTION

Figure 1A:
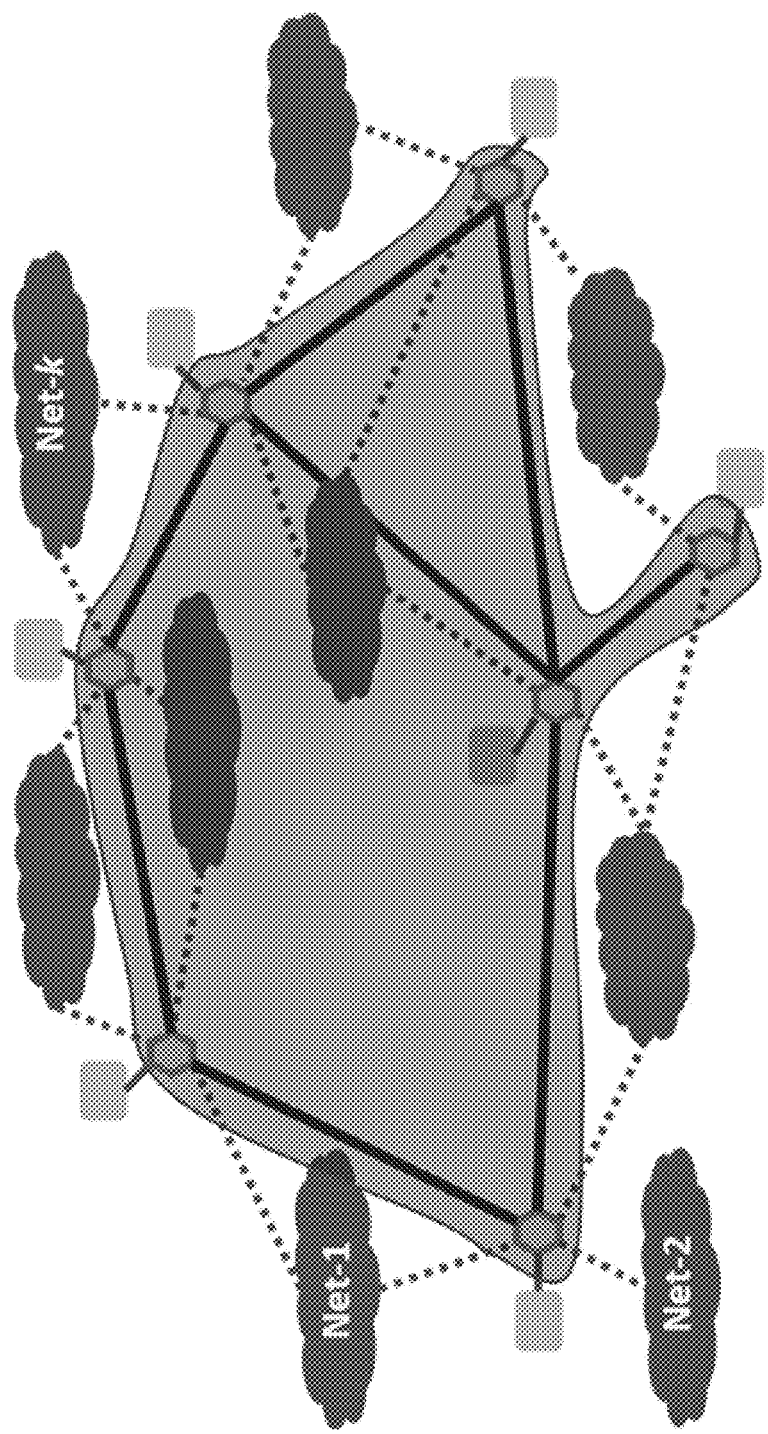
FIG. 1A shows an example of a network that can implement SDCN.

As RF environments become increasingly complex and threats become more sophisticated, systems must be able to automatically respond to maintain communications. To be effective, these systems need the ability to sense, understand, and dynamically adapt to RF impairments at machine-speed timelines without operator intervention.

Embodiments of the disclosed technology provide assured communications in dynamic operational environments by performing distributed sensing and inference for rapid and reliable response in interference and low probability of detection needs across permissive, semi-permissive, and restrictive RF environments. The disclosed embodiments may be hosted on single or multi-channel software-defined radio hardware platforms.

Section headings are used in the present document for ease of understanding and do not limit the embodiments and techniques to the corresponding sections. As such, embodiments from one section can be combined with embodiments from other sections.

1 OVERVIEW OF SOFTWARE-DEFINED COGNITIVE NETWORKING (SDCN)

The described embodiments autonomously operate across the full continuum of operational environments such that the distributed sensing capability characterizes the RF environment, infers actions, and interfaces to a suite of waveforms that intelligently adapt throughput, bandwidth, resilience, and detectability based on the operational environment. In an example, this is achieved by a first node in a network performing (a) an offline training operation and (b) a sensing operation to generate a set of sensing measurements. The latter are used to generate network and interference parameters that characterize a communication channel between the first node and another node in the network. The generated network and interference parameters are used to determine a set of features representative of a data communication between the first node and the other node, which can be performed using one or more available waveforms. The first node includes a decision engine with a machine learning (ML) model that is configured using the offline training operation that was initially performed. The ML model is used in conjunction with the set of features to generate a set of scores, each of the scores being associated with a corresponding waveform of the one or more available waveforms. The waveform associated with the highest score (denoted the operating waveform) is selected, and the data communication between the first node and the other node is performed using the operating waveform.

The described embodiments can be implemented in a variety of RF environments, which include permissive, semi-permissive, and restrictive RF environments. In an example, the RF environments can be characterized as follows:

Permissive: Little or no RF interference, allowing spectrum dominance with a majority of data links being closed persistently across multiple accessible channels-low outage;

Semi-permissive: Local interference (RF congestion) and/or non-sophisticated RF adversary, wherein data links can experience high outage in one channel but not in all, and at least one channel is available for extended time periods; and Non-permissive (restrictive): Existence of a peer RF adversary, with smart (cognitive), distributed and dynamic jamming capabilities, wherein simultaneous high outage and high volatility in in all accessible frequencies, and no single frequency or spatial dimension is available beyond a brief time-period.

FIG. 1A shows an example of a network that can implement software-defined cognitive networking (SDCN), as described herein. The network shown in FIG. 1A, which may be subject to any of the aforementioned RF environments, provides an example of both homogenous networks and heterogeneous (inter) networks.

Homogeneous networks. In the example of the homogeneous network, the described embodiments are implemented from a radio point-of-view, wherein the set of sensing measurements include per-link estimates of data channel fidelity, latency measurements, and in-band information from the data channel. More generally, the set of sensing measurements correspond to observables that are associated with Layers 1, 2, and 3 of the Open Systems Interconnection model (OSI model), e.g., the physical layer, the data link layer, and the network layer, respectively. These set of sensing measurements are used to first generate network and interference parameters and then determine a set of features, which may correspond to link-level fidelity metrics for homogenous networks. Herein, the one or more available waveforms are flexible and configurable versions of a waveform, e.g., different modes of a waveform.

In some embodiments, the one or more waveforms include primary (P) waveforms and alternate (A) waveforms. In an example, P waveforms are suitable for operation in permissive and semi-permissive environments, rapidly adapting to sensed interference dynamics. When the P waveforms reach an adaptation limit, the "adaptation wall", and can no longer adapt, the cognitive radio hardware can be reprogrammed to use a more resilient and/or lower detectability waveform for operations in restrictive environments, e.g., the A waveforms.

Characteristics of primary (P) waveforms include:
Resilient MANET waveform family supporting wideband user traffic (e.g., video, multi-channel voice, position location information (PLI), bulk data)
Wideband (multi-channel) RF sensing and interference characterization
Autonomous adaptation of operating frequency, e.g., dynamic spectrum access
Autonomous adaptation of bandwidth, modulation, and coding Characteristics of alternate (A) waveforms include:
Robust MANET waveform family supporting narrowband user traffic (e.g., voice, PLI and chat)
Wideband (multi-channel) RF sensing and interference characterization
Autonomous adaptation of bandwidth, modulation, and coding Ability to operate as an independent control plane, interfacing a separate data plane waveform in a two-channel radio In some embodiments, SDCN integrates cognitive algorithms with waveforms suitable for operations on both single and dual channel software-defined radio (SDR) hardware platforms. In the example of a single channel architecture, SDCN relies on switching between the two waveforms based on spectral sensing observables from the (P) waveform capabilities. In an example two-channel architecture, the (A) waveform acts as a separate cognitive control plane that (i) maintains persistent network connectivity and (ii) augments (P) waveform capabilities with highly-protected control dissemination. The two-channel SDCN allows for far greater flexibility, resilience, and overall efficiency compared to (i) traditional two-channel waveforms with independent fragile in-band control and (ii) dedicated MIMO processing that commits two channels for limited link-level transmit beamforming/receive null-steering gains that can be overwhelmed by peer RF adversaries.

Figure 1B:
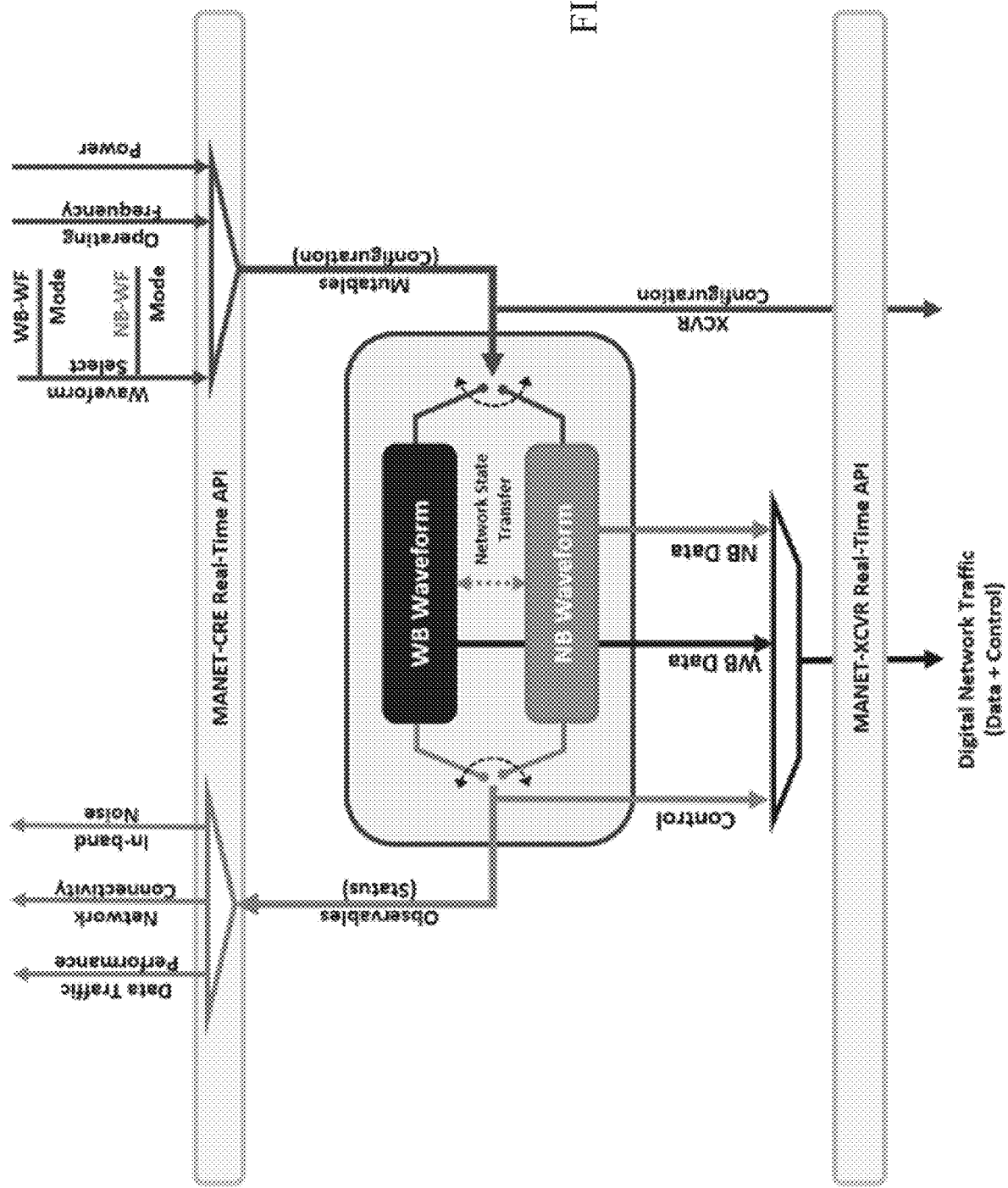
FIG. 1B shows an example SDCN architecture for a homogenous network.

FIG. 1B shows an example SDCN architecture that can be used to switch between the (P) waveform (e.g., the WB waveform in FIG. 1B) and the (A) waveform (e.g., the NB waveform in FIG. 1B). In this example, the WB waveform operates with an instantaneous bandwidth equal to the operating bandwidth, and the peak data rate supports the fastest traffic service, e.g., full-motion video, and the NB waveform is a frequency-hopping waveform, with an instantaneous bandwidth smaller than the operating bandwidth and the peak data rate supports the fastest traffic service, e.g., voice.

As shown in FIG. 1B, the decision to select the waveform may trigger a state transfer between the two waveforms to avoid costly network formation from scratch, thereby reducing data outage. In an example, the transferred network state comprises the prevailing network controller node identifier, network time and/or frequency synchronization information, as well as a history of network connectivity metrics and in-band noise measurements maintained by either waveform.

Heterogeneous (inter) networks. In the example of the homogeneous network, the described embodiments are implemented from a router point-of-view, wherein the set of sensing measurements include per-transport connectivity, latency, policy and planning decisions (e.g., from a Net Manager), and per-transport security features. More generally, the set of sensing measurements correspond to observables that are associated with Layers 4, 5 and above of the OSI model, e.g., the transport layer, the session layer, and above. These set of sensing measurements are used to first generate network and interference parameters and then determine a set of features, which may correspond to transport-level fidelity metrics for heterogeneous networks. Herein, the one or more available waveforms are distinct waveforms (or transports), each with their own set of modulations, throughputs, channel coding, etc.

2 EXAMPLES OF SDCN ARCHITECTURE

SDCN radio algorithms fully exploit resilient control plane capabilities to perform distributed sensing and inference for rapid and reliable response against interference events across permissive, semi-permissive and restrictive/non-permissive RF environments.

Figure 2:
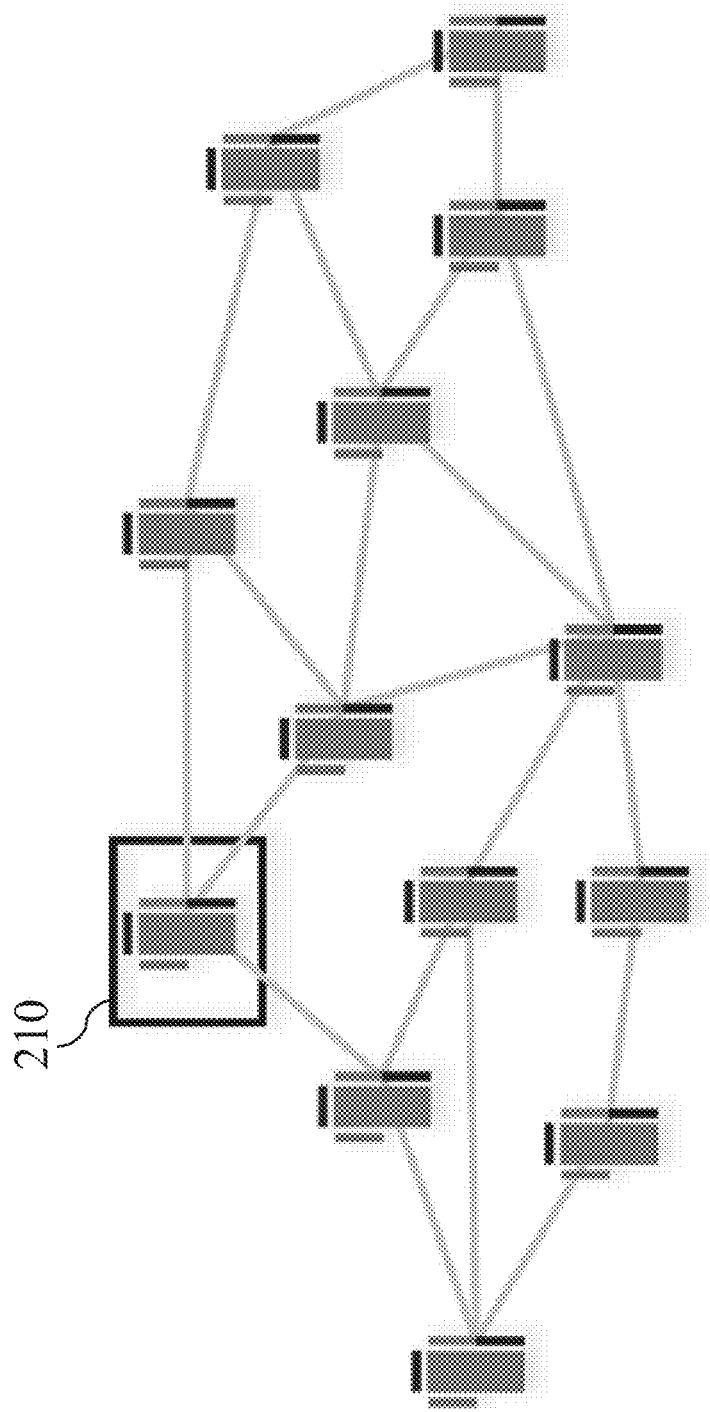
FIG. 2 shows an example of multiple radios in an ad-hoc network that are connected via a robust control plane and implement SDCN.
Figure 3:
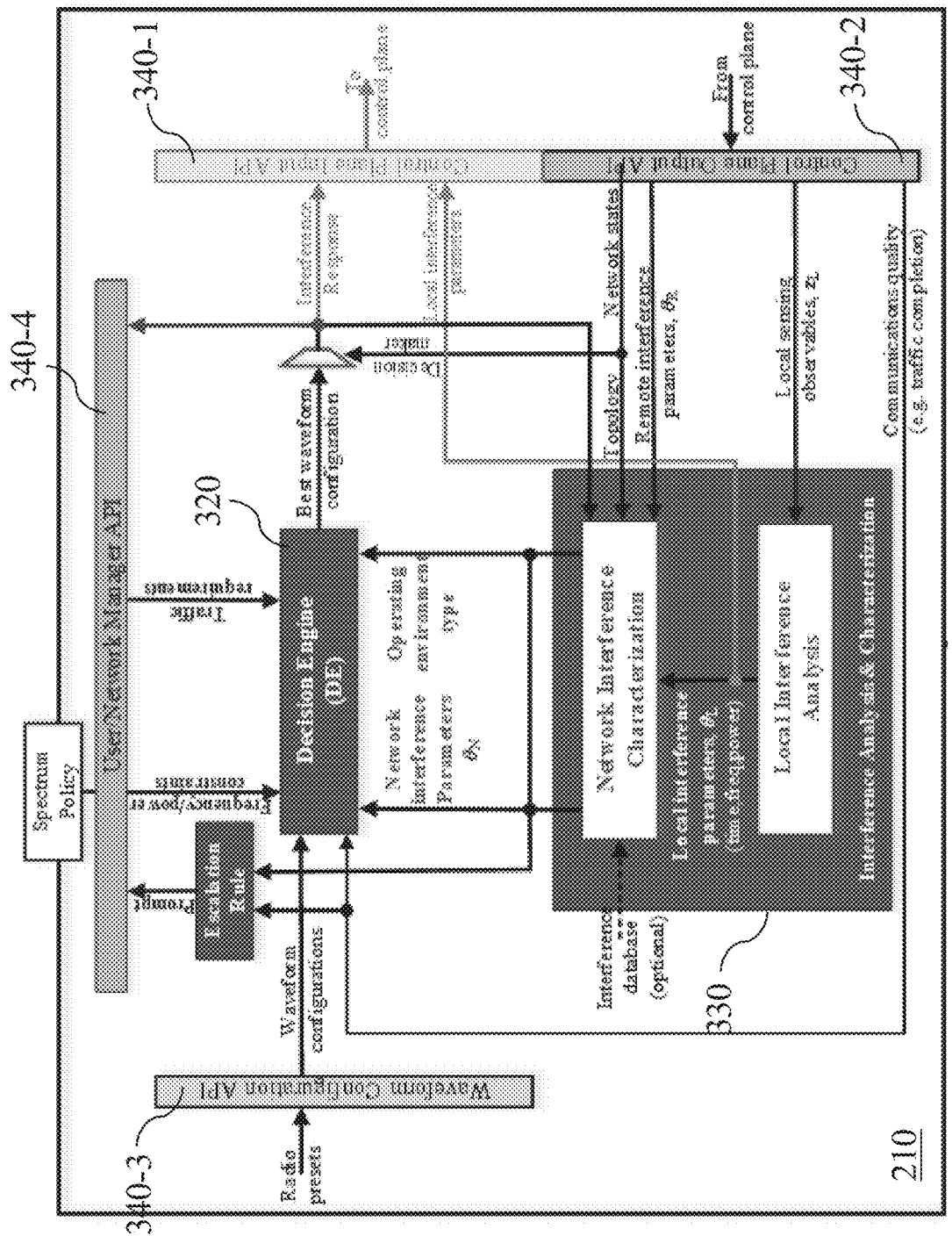
FIG. 3 is a block diagram of an example SDCN module.

FIG. 2 shows an example of multiple radios in an ad-hoc network that are connected via a robust control plane and implement software-defined cognitive networking (SDCN). In some embodiments, each of the multiple radios is substantially similar with regard to capabilities and configurability. For example, any of the multiple radios shown in FIG. 2 may operate as a source, a destination, a relay, or a controlling node. The multiple radios include software-defined radio 210, which is detailed in FIG. 3 that illustrates the SDCN radio algorithm architecture. As shown in FIG. 3, the SDCN radio algorithm architecture includes a decision engine (DE) 320, an interference analysis and characterization module 330, and multiple application program interfaces (APIs) that enable the decision engine and interference analysis and characterization module to communicate with the control plane, radio presets, radio spectrum policy, and other functionality.

The interference analysis and characterization module 330 includes, amongst other components, a local interference analysis module, which is configured to receive local sensing observables (e.g., interference measurements) and generate local interference parameters, and a network interference characterization module, which is configured to receive remote interference parameters (e.g., from other radios) and topology information associated with the physical locations of the radios in the ad-hoc network. As shown in FIG. 3, the local sensing observables, remote interference parameters, and topology information are received via the control plane output API 340-2. In some embodiments, the network interference characterization module can be further configured to receive an interference database. In an example, the interference database include labeled interference data for known or previously encountered interference, e.g., a swept-tone jammer with a first set of parameters operating between 30 dB and 50 dB, a tone jammer at a specific frequency at 100 dB, and the like.

In some embodiments, the interference parameters can include the measured power for multiple time-frequency states. In other embodiments, a finite state machine or Markov model can be used to model the sensed excess power in the time-frequency domain. In yet other embodiments, the evolution of the interference over different frequency bands as a function of time can be used as the interference parameters.

In some embodiments, the topology information includes 1-hop and/or 2-hop neighboring node tables received from other nodes. In other embodiments, the topology information comprises PLI from the other nodes. In yet other embodiments, a complete network radio frequency (RF) topology map (e.g., a bidirectional weighted graph corresponding to the channel fidelity between pairs of nodes in the network) may be received from a node (e.g., a controller node in the ad-hoc network).

The network interference characterization module accepts the local sensing observables, remote interference parameters, and topology information (and optionally, the interference database), and generates network interference parameters (denoted ON) and an operating environment type (e.g., non-permissive, semi-permissive, or permissive).

The decision engine 320 is configured to receive (a) network interference parameters ON and the operating environment type from the network interference characterization module 330, (b) waveform configurations via the waveform configuration API 340-3, and (c) radio and performance constraints and requirements via the user/network manager API 340-4. The decision engine 320 combines the inputs to generate the optimal waveform configuration, which is output to the control plane via the control plane input API 340-1.

In some embodiments, the SDCN radio algorithm architecture shown in FIG. 3 provides, amongst other benefits, the following capabilities through standard software interfaces.

Local interference analysis and information minimization: SDCN radio algorithms process local sensing observables to characterize interference in time (across sensing epochs), and in frequency (across multiple channels), generating statistical models of interference on-the-fly. The local interference models are condensed to a few key parameters for efficient dissemination across the network and low-complexity synthesis of an optimal response.

Network interference characterization via information fusion: SDCN radio algorithms integrate local interference parameters of networked radios into a coherent network interference model, which exploits topology information to characterize spatial as well as spectral and temporal states of the RF interference. The network interference model is used to classify the operating interference environment (as permissive, semi-permissive or restrictive/non-permissive), and formulate an interference response. In some embodiments, the information fusion techniques can be implemented by adding the spatial dimension to the Markov chain model that was generated for each individual node.

Network interference response: SDCN radio algorithms incorporate a machine-learning Decision Engine (DE) to map the network interference model to a network interference response, by selecting one of a plurality of waveform configurations. When operated in conjunction with the described SDCN primary (P) and alternate (A) waveforms, the DE functionality is greatly simplified, and requires minimal feedback regarding communication quality. For example, in a permissive/semi-permissive RF environment, the DE formulates a frequency-switch action for P waveform dynamic spectrum access (DSA), together with bandwidth and data-rate selection, whereas in a restrictive/non-permissive environment, all high-priority mission critical traffic is switched to the A waveform. The decisive interference response command is issued by a single SDCN radio with the highest network centrality at response time, minimizing the artifacts due to incomplete/fragmented network transition and avoiding any single point-of-failure.

3 EXAMPLES OF INTERFERENCE MODELS

Figure 4:
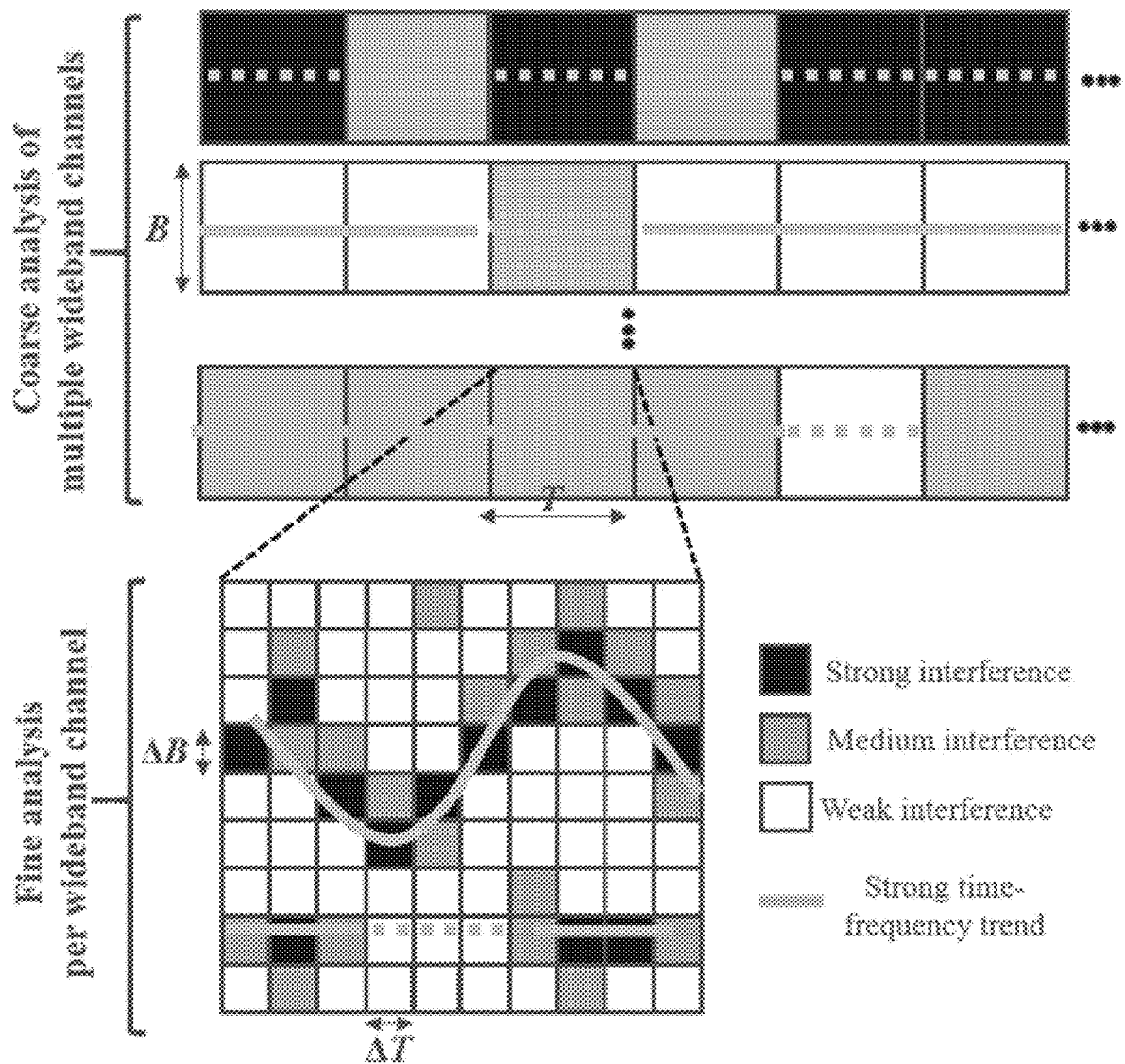
FIG. 4 shows an example of local interference analysis.

In some embodiments, the interference analysis and characterization module 330 shown in FIG. 3 can be configured to perform SDCN local interference analysis and develop a network interference model. For example, as shown in FIG. 4, the local interference analysis may be performed at each SDCN radio sensing epoch over a T msec duration and B MHz wideband channel. In some embodiments, the local interference analysis includes a coarse time-frequency analysis, a fine time-frequency analysis, and generation of the interference model.

As shown in the upper portion of FIG. 4, the coarse time-frequency analysis includes measuring power in the sensing epoch, mapping the excess ambient power to a normalized interference score I(k,n) for epoch (k,n), and using the evolution of the local interference to inform frequency switching for the operating waveform. The sample captures from each wideband sensing epoch is further analyzed, as shown in the lower portion of FIG. 4, at finer detail ($\Delta T \times \Delta B$) as part of the fine time-frequency analysis. Herein, the excess ambient power is mapped to a normalized interference score I($\Delta k, \Delta n$) for sub-epoch ($\Delta k$, $\Delta n$), which reveals finer details that can be used to inform interference excision.

The disclosed embodiments enable the formulation of an interference model, which includes an efficient finite-state model for interference scores across resolved (coarse and fine) time-frequency bins that is compressed to a few parameters, e.g., $\theta_L$: power and volatility and/or predictability. In an example, radios with interference excision capabilities may be configured to determine estimates of residual (post-mitigation) power.

Figure 5:
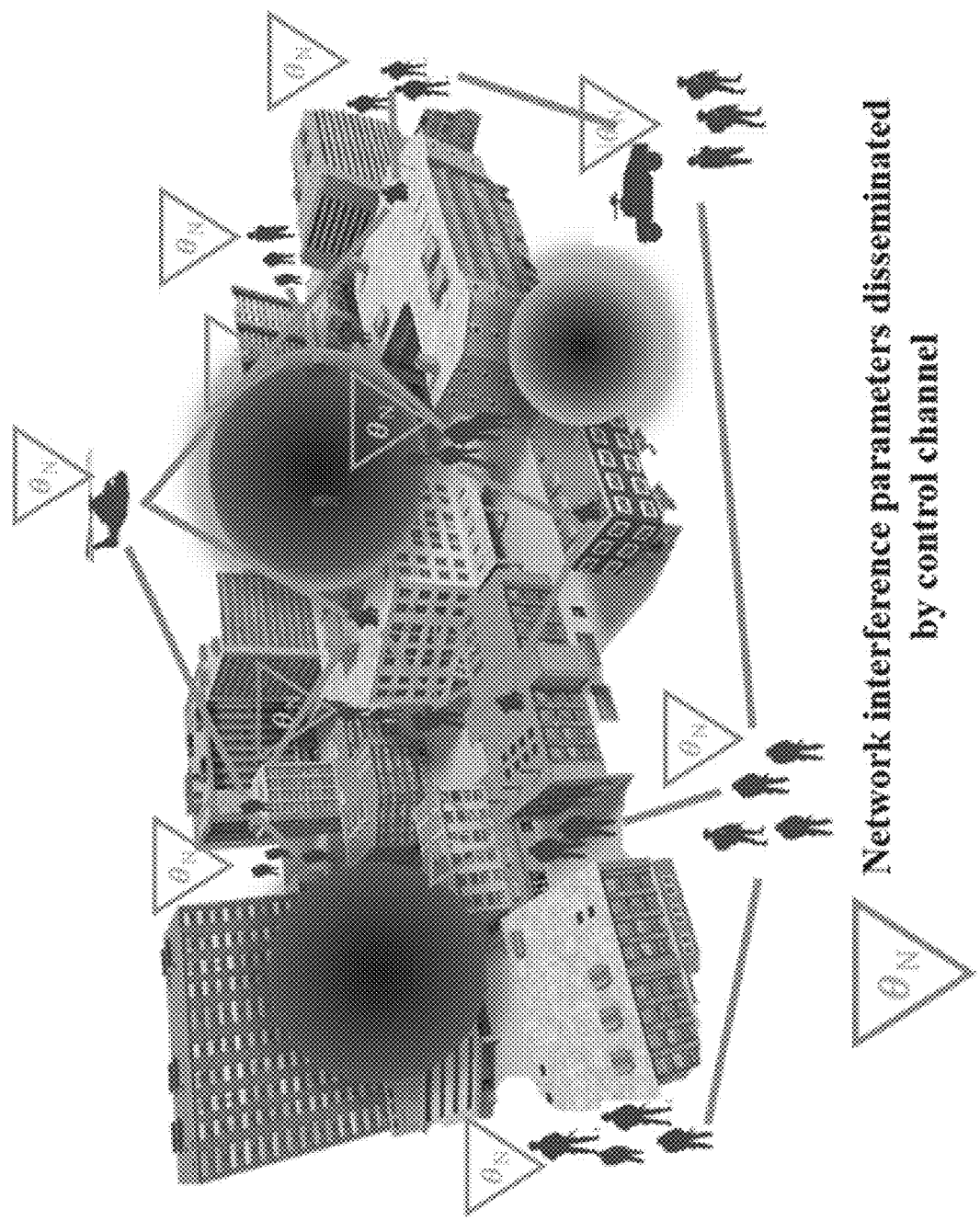
FIG. 5 shows an example of a network interference model.

In some embodiments, as shown in FIG. 5, a network interference model may be determined as $\theta_N = \{\theta_L^{(n)}\} \cup \mathcal{G}_C$, wherein $\theta_L^{(n)}$ represents the local interference parameters from all the networks radio nodes (e.g., over multiple sensed frequencies) and $\mathcal{G}_C$ represents the prevailing network connectivity (e.g., the topology as determined by a control channel in the operating frequency). In an example, this network interference model can determine:

a Network Interference Score (NIS) on an operating frequency that estimates the impact of interference on connectivity, e.g., nodes may have strong local interference but good connectivity, or benign local interference but poor connectivity, based on other RF conditions;

interference environment classification, which includes permissive (persistently low NIS), semi-permissive (low NIS can be maintained with interference excision or DSA), or non-permissive or restricted (persistently high NIS, even with DSA); and dynamic election of SDCN decision maker, wherein the prevailing node with the highest network centrality is designated as the decision maker.

Figure 6:
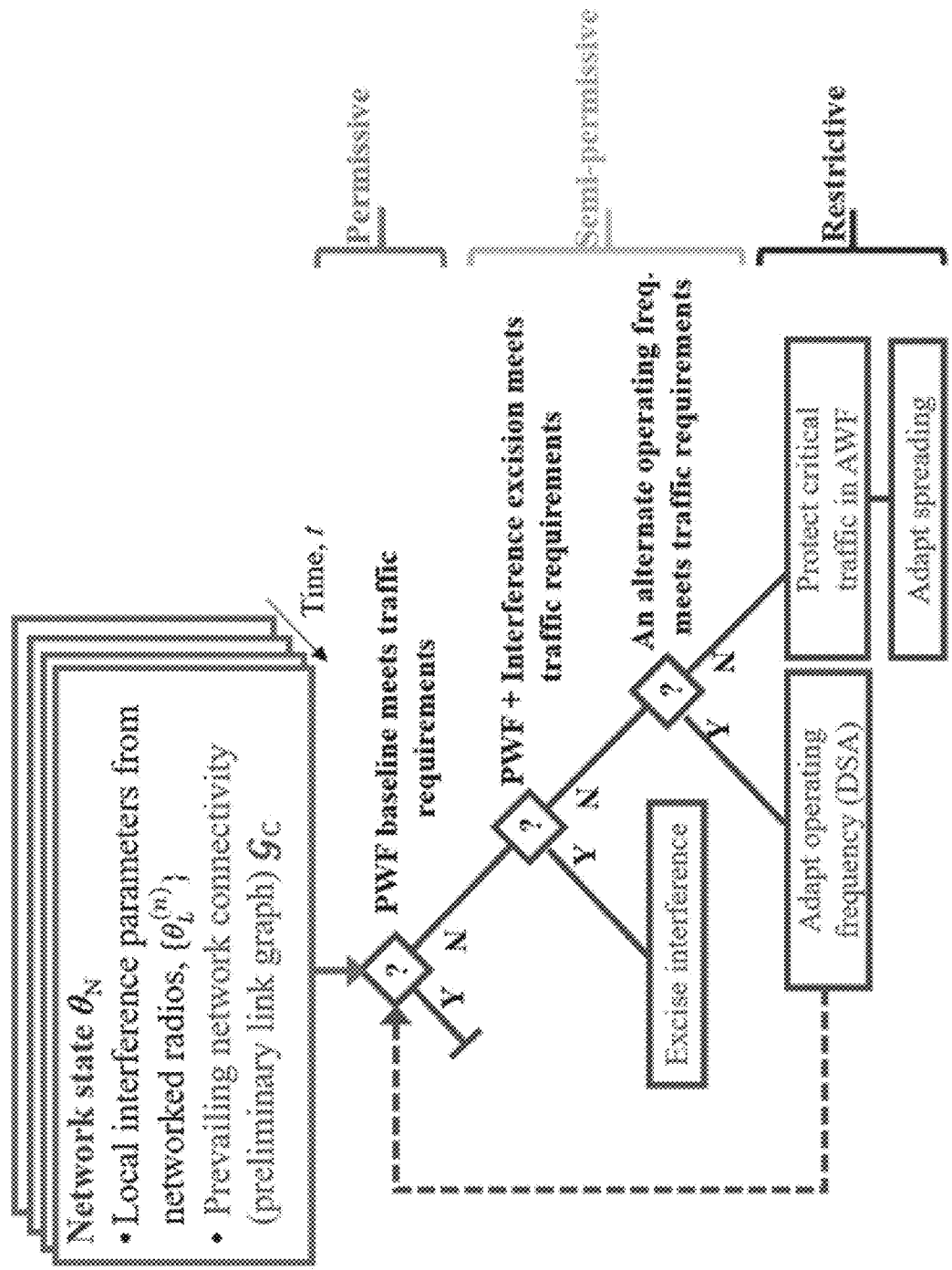
FIG. 6 shows an example response to network interference.

FIG. 6 shows an example of a notional decision tree for SDCN interference response, which is implemented autonomously by the decision engine (detailed in the next section), and maps to the network interference model discussed in the context of FIG. 5, e.g., permissive environment when traffic requirements are met using the baseline. Embodiments of the disclosed technology are configured to implement the response to network interference based on a partially observable network state with unknown dynamics (as compared to an ideal scenario that provides full network state information).

Figure 13:
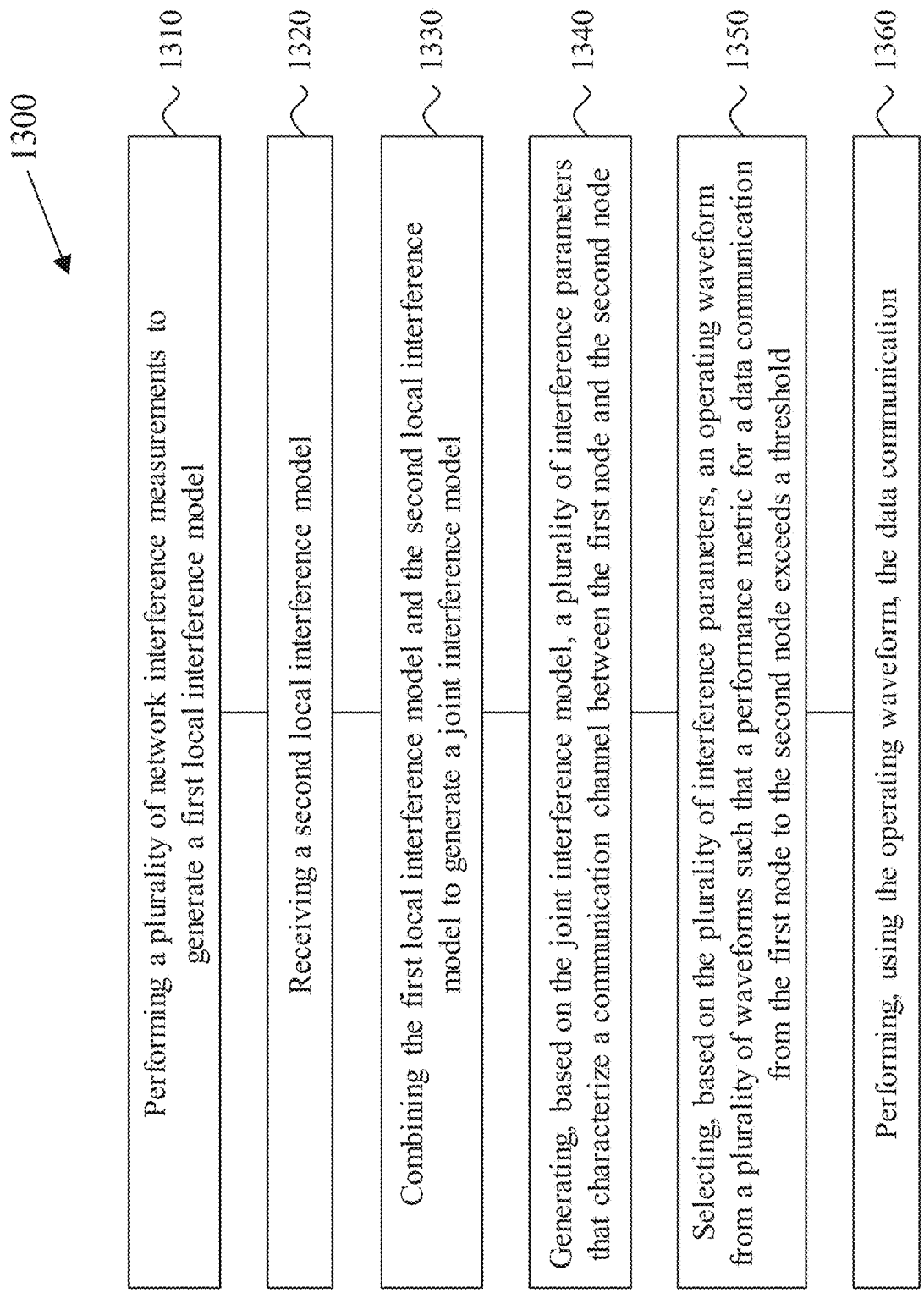
FIGS. 13-15 are flowcharts of example method of wireless communication.

In some embodiments, and with reference to FIG. 13, the local interference analysis described in FIG. 4 may be used to generate a local interference model, and the network interference model described in FIG. 5 may be used to generate the joint interference model.

4 EXAMPLES OF THE DECISION ENGINE

Figure 7:
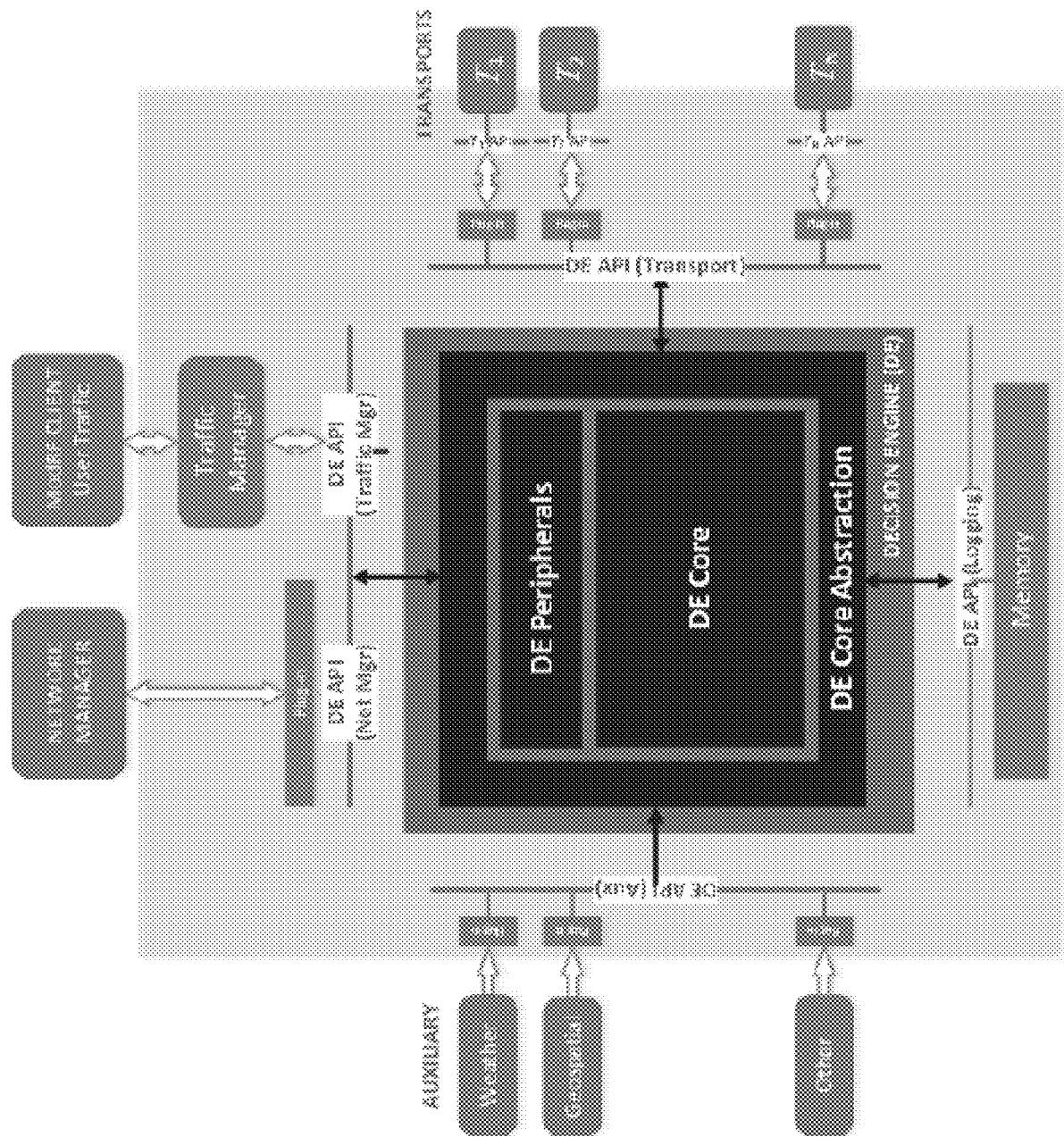
FIG. 7 show an example architecture of the decision engine (DE).

In some embodiments, the decision engine 320 show in FIG. 3 may be implemented as shown in FIG. 7. As shown therein, the decision engine includes APIs (e.g., DE APIs) that uses plug-ins to connect to various data API, e.g., the DE Net Manager API is used to receive observables from the Network Manager, and the DE Auxiliary API is used to receive auxiliary information such as weather updates, geo-spatial information, and the like. The DE APIs are responsible for getting the relevant data to and from the DE. In an example, the DE APIs may be implemented using open-source or proprietary libraries written in C#, Python, Java, etc. The DE core abstraction, shown in FIG. 7, summarizes data from multiple DE APIs into DE core features, thereby advantageously decoupling the DE core from the external context.

Figure 8A:
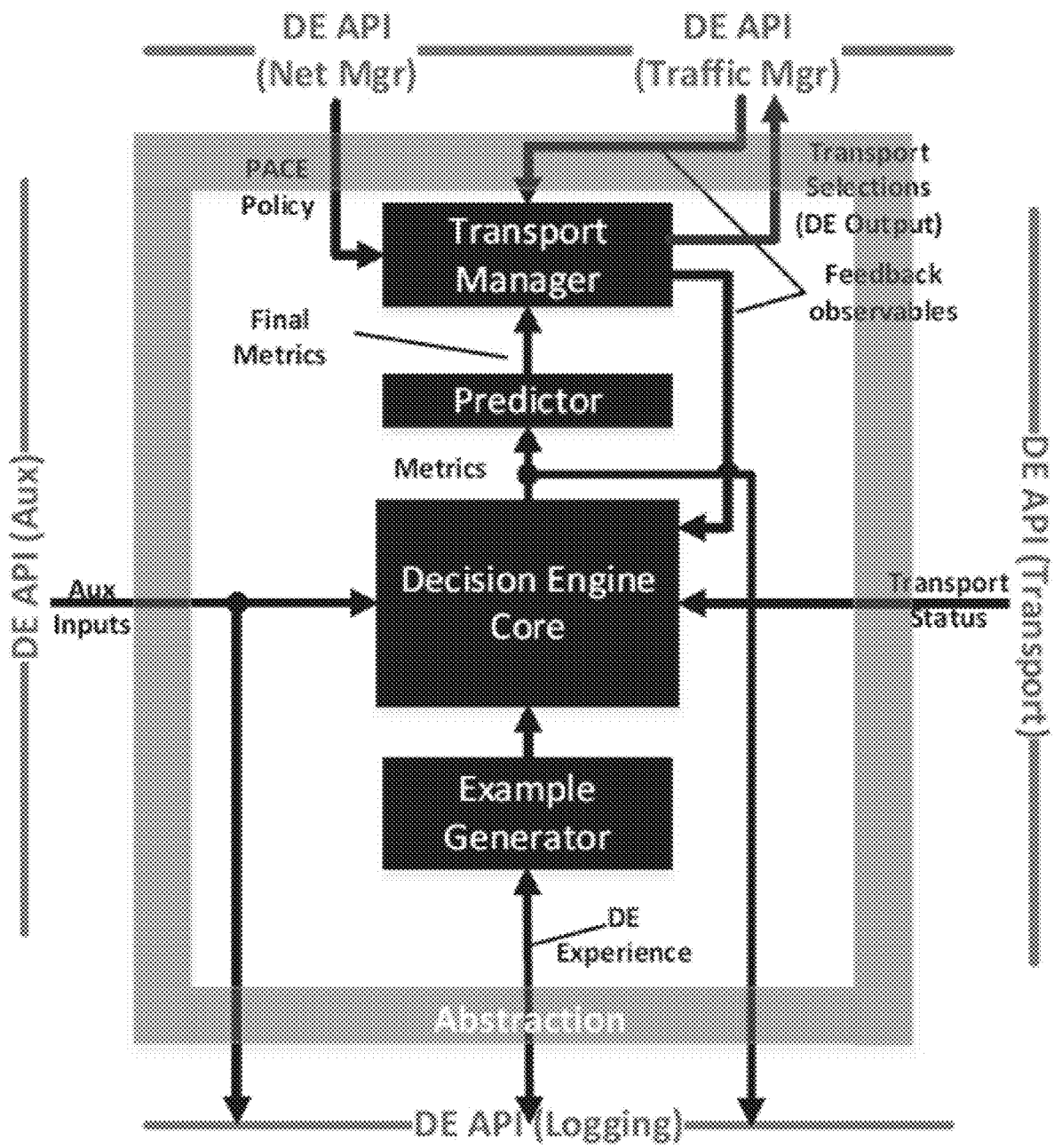
FIGS. 8A and 8B show elements of example DEs.
Figure 8B:
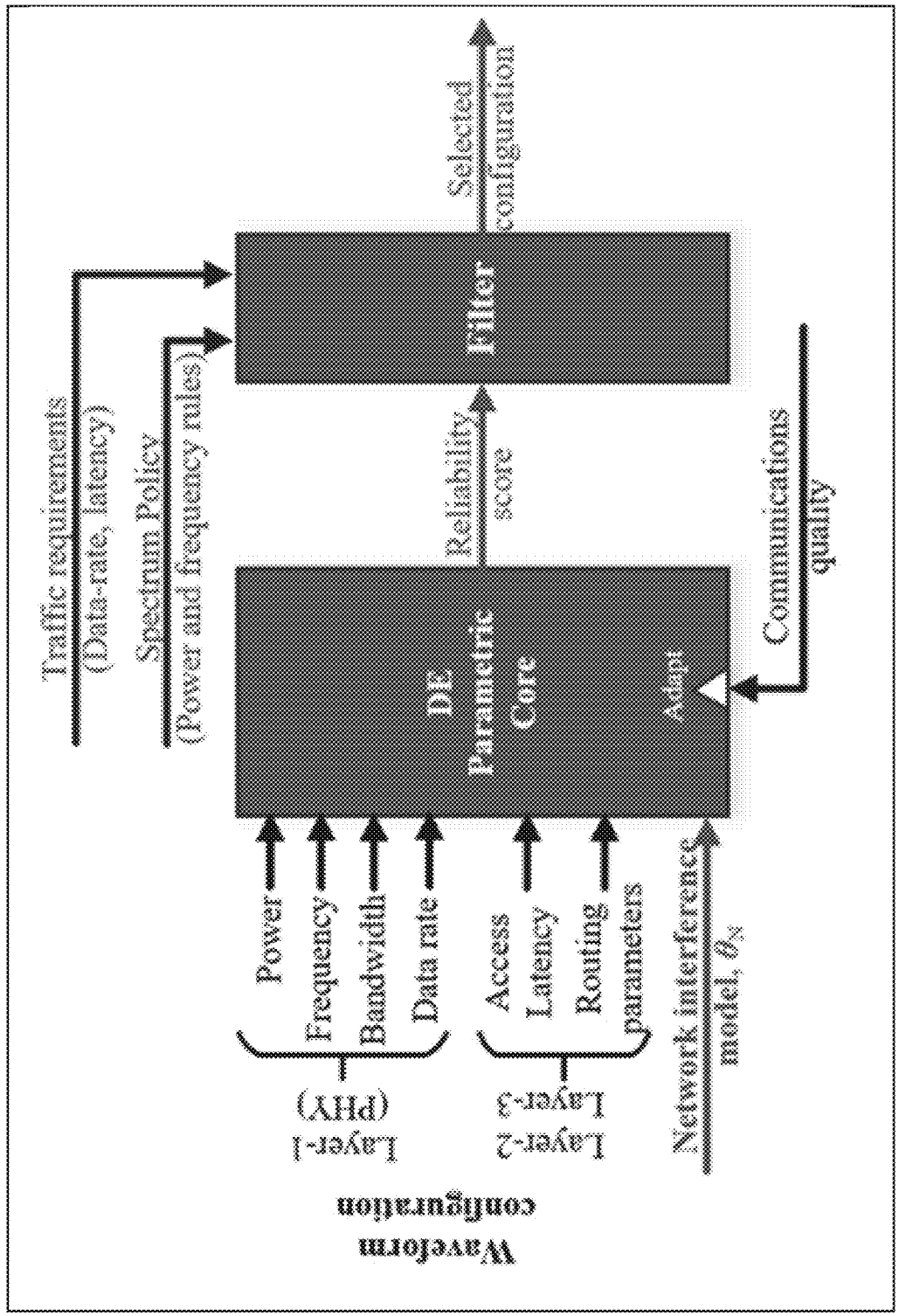

FIGS. 8A and 8B show elements of example DEs. In the example shown in FIG. 8A, the DE core generates metrics (e.g., scores) that represent the feasibility of available transports (in the case of heterogeneous networks) or available waveforms (in the case of homogenous networks) for different traffic flows. The metrics are filtered for prediction, and the transport manager enforces any existing policies and rules, and makes the final selection decisions. In an example, the DE core is trained using the Example Generator (e.g., as part of the offline training) that is configured to generate pseudo-random synthetic data and re-play field data.

In the example shown in FIG. 8B, the DE core may be configured to use a modified deep Q-learning (DQL) framework with built-in reward prediction based on the sensed network state. In some embodiments, the DQL framework is implemented with optional sparsity for accelerated training. The DE core is pre-trained (e.g., trained using the offline training method) using a combination of synthetic data and field data from prior sessions. During operation, the DE core may then be adapted online using long-term value iteration.

In some embodiments, the machine learning (ML) model used in the DE can be defined by an ML architecture (e.g., the number of hidden layers, the number of nodes in each hidden layer, the connectivity between the nodes across layers, etc.) and a set of ML weights (e.g., the numerical values associated with the nodes when the ML model is used for training and/or inference). In this document, the ML architecture is referred to as the topology of the ML model (and is distinguished from the network topology or network RF topology that described characteristics of the nodes of the network).

The examples of the DE core shown in FIGS. 8A and 8B provide, inter alia, the following advantages and benefits:
  fully leveraging network state information minimization for a small implementation footprint and fast training;
  pre-training (offline training) to enable reliable operation with sparse feedback;
  adaptation to a diverse set of waveforms using APIs; and
  built-in reward prediction, which obviates random exploration such that the performance is not subject to the vulnerabilities of "trial-and-error" learning methods.

Figure 9:
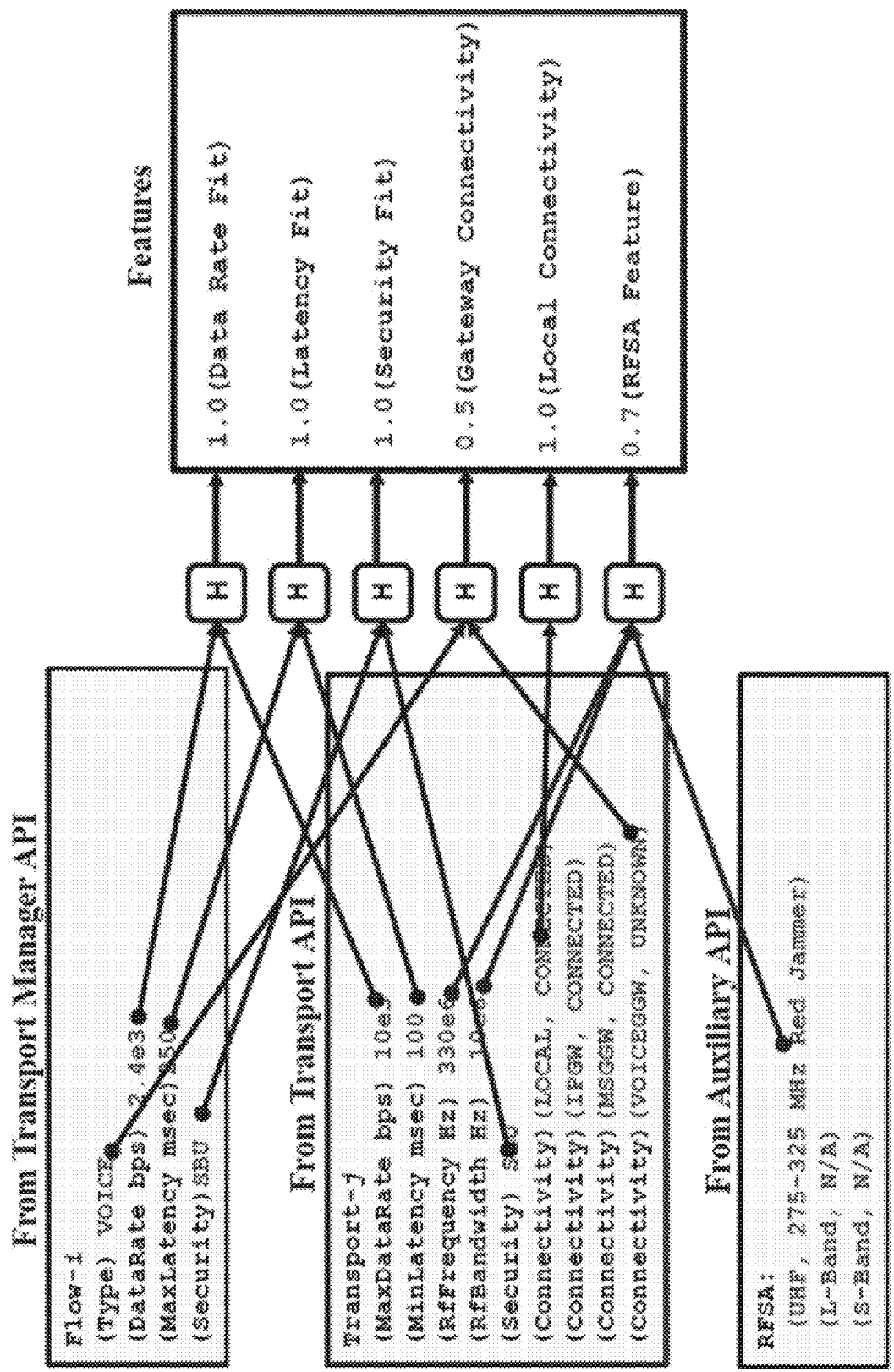
FIG. 9 shows an example of abstraction as implemented by the DE.

FIG. 9 shows an example of abstraction as implemented by the DE. The abstraction used by the DE enables operation with, in an example, no more than a dozen features regardless of the dimensionality of the data received through the DE APIs. In the example shown in FIG. 9, data from the Transport API, the Transport Manager API, and the Auxiliary API and transformed into six features that are representative of the communication channel and data transfer between the two respective nodes in the network.

Figure 10:
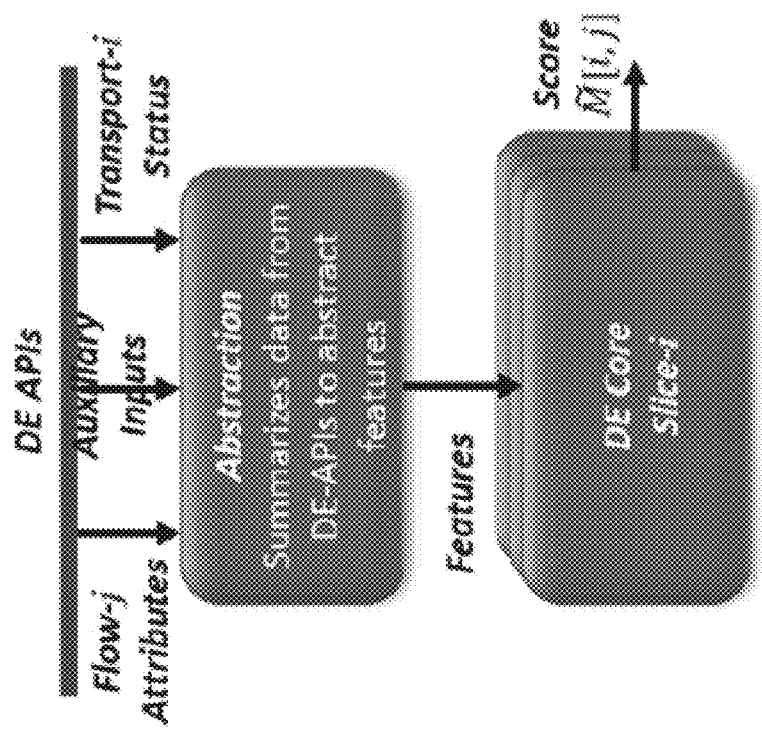
FIG. 10 shows an example architecture of the DE core.

FIG. 10 shows an example architecture of the DE core. As shown therein, the DE core produces a metric (or score) that summarizes the fit of the transports or waveforms for the various flow traffic types. The scores may be interpreted as the confidence in (or probability of) the transport being able to reliably support a specific traffic flow. As shown in FIG. 10, the DE core may be implemented using parallel learning engines, called slices, such that one learning engine is used to determine the appropriate transport or waveform for a particular flow. The slices evolve differently, and are a function of transport/waveform-related observables. This architecture advantageously ensures that the processing complexity is reduced, and that learning is decoupled from the multiplicity of the transports/waveforms.

Figure 11:
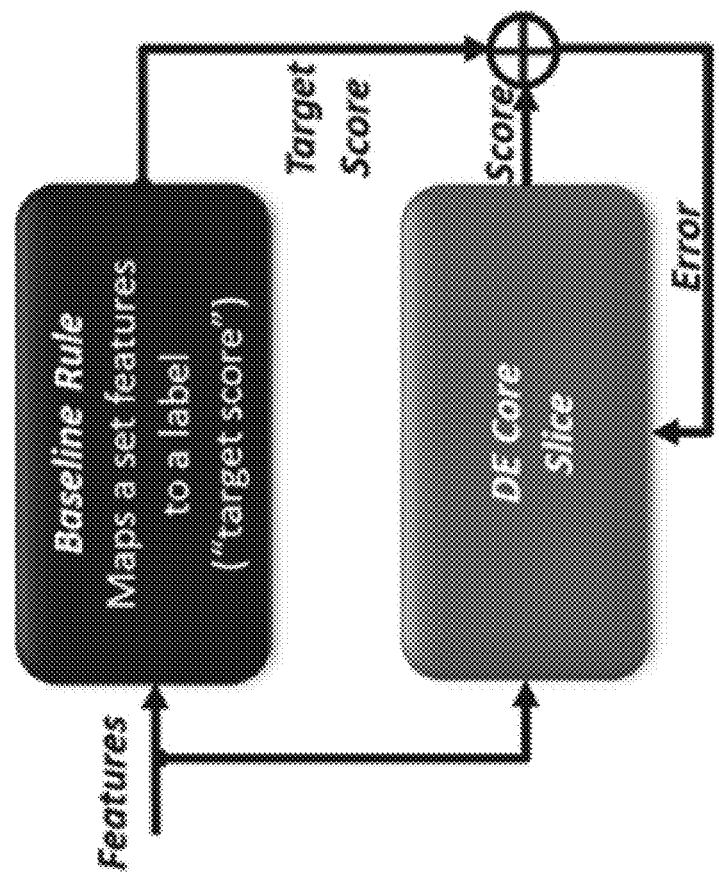
FIG. 11 shows an example of offline learning (or training) of the DE core.

FIG. 11 shows an example of offline learning (or training) of the DE core. As shown therein, the feature are used to develop a baseline rule, which may not be amenable to online adaptation but can be trained efficiently, and then transferred to an adaptable model. The model complexity of the neural network that the baseline model is transferred to is kept higher than that of the baseline model to ensure that the baseline model is fully captured and so that the model can adapt/learn in a dynamic environment.

Figure 12:
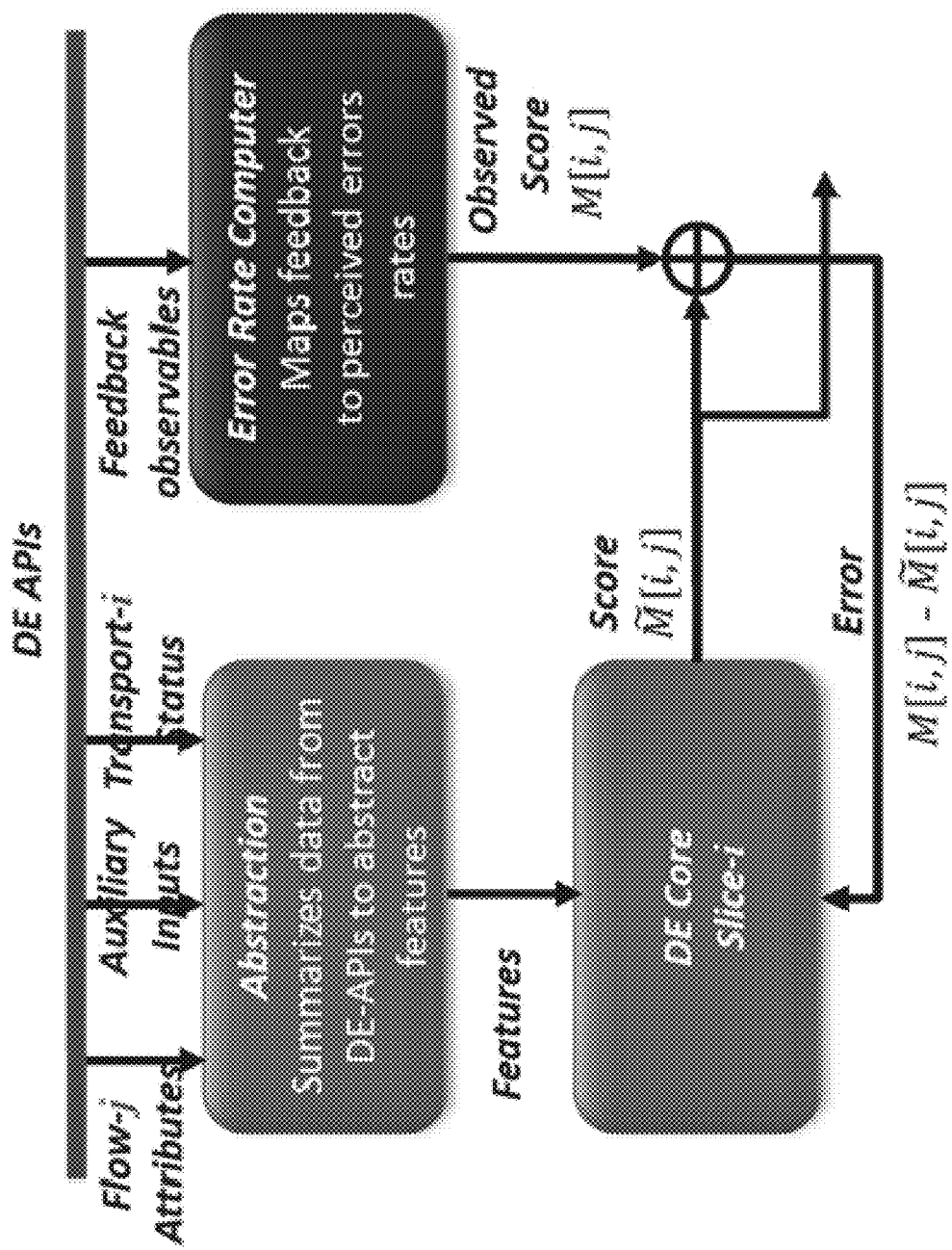
FIG. 12 shows an example of online learning (or adaptation) of the DE core.

FIG. 12 shows an example of online learning (or adaptation) of the DE core. As shown therein, the online (or runtime) operation uses the neural network model (or DQL model or machine learning model) to receive the abstracted features and the compute scores for each of the available transports/waveforms. An error rate computer can also be configured to receive feedback observables, and map the feedback to perceived error rates, which can be used to improve and adapt the adaptation of the corresponding DE core slice.

In some embodiments, the DE processing flow includes the following states:
  (1) offline training, as described in FIG. 11;
  (2) score generation, in which observables are used to determine the set of scores for each of the available transports/waveforms; and
  (3) adaptation, as described in FIG. 12.

In some embodiments, the DE processing timeline includes:
  Offline: the learning model for the DE core is determined via offline training and testing for each of the candidate topologies;
  t0: complete DE core initialization;
  t1: preliminary transport decisions are made using feasibility scores based on direct observables, e.g., status of available flows, auxiliary observables, etc.;
  t2: adaptation of DE core complete;
  t3: scores and transport decisions are updated based on new observables; and
  t4: use feedback to adapt the DE core.

In some embodiments, the state of the DE core may be committed to memory, and can be re-trained using logged data.

5 EXAMPLES IMPLEMENTATIONS OF THE DISCLOSED TECHNOLOGY

In some embodiments, implementations of the disclosed technology provide, amongst other benefits and features, the following capabilities:
  (1) Interference identification. SDCN radio algorithms identify interference simultaneously in time (across sensing epochs), and in frequency (across multiple sensed channels), using available sensing observables, e.g., provided by the SDCN primary and alternate waveforms. Each radio independently analyzes its local interference environment and summarizes its statistics by a few key parameters describing power density as a function of latent time-frequency states.

In some embodiments, an interference event in any one of the accessible channels/frequencies is rapidly detected by monitoring the power parameter of the local and remote interference models. An optimal interference response is formulated autonomously by the Decision Engine (see (6) below) based on the outcome of Interference Analysis and Classification (see (3) below).
  (2) Restoring communications. In a permissive/semi-permissive environment, the P waveform automatically responds to interference events by changing its operating frequency and bandwidth/data-rate. In a two-channel implementation, the A waveform further expedites the P waveform DSA functionality via faster and even more resilient dissemination of the interference analyses and frequency-switch commands. When used with generic data communication waveforms, the response time of the SDNC cognitive radio algorithms to interference events is governed by the availability of sensing observables locally as well as those reported by other networked radios.

(3) Interference analysis and classification. Each SDCN radio continually updates, stores, and distributes its local interference model parameters across the network control plane. The SDCN Network Interference Characterization module combines the interference model parameters extracted locally and those reported by other radios into an aggregate statistical model for network interference across time, frequency, and space, exploiting pertinent network states (e.g., PLI, or basic topology). The network interference model is analyzed (i) independently, (ii) against databased models (if available), and (iii) in correlation with past adaptation decisions to detect anomalous behavior or sophisticated (cognitive) hostile jamming capability indicative of a peer adversary. As a result, the operating RF environment is classified as permissive, semi-permissive or non-permissive/restrictive.

(4) Escalating response. The SDCN CRA autonomously escalates response using Escalation Rule (shown in FIG. 3), which determines severe network disruption based on the perceived interference environment and prevailing communications quality. In some embodiments, the Escalation Rule relies on monitoring the underlying PLI service to detect a persistent absence of PLI updates.

(5) Maintaining networked connectivity. SDCN radio algorithms issue waveform interference response via standard control plane interfaces for dissemination across the network. Reliable distribution of the interference response to all cognitive radios calls for robust control plane that could withstand the dynamic RF degradations that prompt such response, as provided by the described SDCN waveforms. The SDCN interference response does not rely on a static channel configuration or frequency allocation for coordination. The requisite rendezvous for P waveform DSA and for P-A waveform-switch is accomplished blindly, with control information disseminated over multiple available frequencies in a pseudo-random fashion.

(6) Interference response. SDCN radios incorporate a machine learning Decision Engine (DE) that maps the network interference model parameters to an interference response, as illustrated in FIG. 3. The end-to-end reliability of a generic waveform configuration is predicted by the DE Core, a parametric machine learner that correlates the network interference model with the estimated spectral footprint of the data-plane in that configuration.

As discussed in Section 4, the DE Core is pre-trained (initialized offline) using relevant field and synthetic data for desired behavior, obviating "trial-and-error" online learning that may fail to converge in non-stationary RF environments. Any feedback on prevailing communications quality is used to adapt the DE Core parameters, adjusting the reliability scores in accordance with unknown/unmodeled aspects of networking, such as RF propagation effects. In accordance with the user traffic requirements and the frequency/power rules from the Spectrum Policy (also shown in FIG. 3), the feasible waveform configurations are filtered down to a single configuration, ready to be issued as a decisive response by the responsible radio. In some embodiments, the SDCN DE is configured to operate most efficiently in conjunction with the described P and A waveforms that do not require Layer-3 routing protocol knowledge in the decision loop. In permissive and semi-permissive RF environments, the DE formulates channel/frequency selection for the P waveform DSA, together with bandwidth and data-rate selection. In a restrictive/non-permissive environment, all high-priority mission critical traffic is switched to the A waveform. The decisive response is issued by the radio that has highest network centrality at decision time, minimizing the likelihood of incomplete/fragmented network response.

In some embodiments, the Decision Engine can be implemented as described in Section 4. In other embodiments, the Decision Engine can be implemented as a combination of the DE described above and as described in Section 4.

(7) Learning from past performance. The SDCN Decision Engine integrates experience replay capability, whereby effectual interference responses are stored along with their respective network interference states. The DE Core behavior is periodically reinforced using samples from this replay memory.

Embodiments of the disclosed technology provide a suite of networked waveforms that enable on-the-move operations in congested and contested environments. These waveforms bring the ability to sense the RF environment and operate in conjunction with cognitive radio algorithms to enable SDCN resilient operations across permissive, semi-permissive and restrictive environments. As described above, the described embodiments provide the flexibility to support operations in both single and two channel radio architectures.

In some embodiments, Barrage Relay networking (BRn) is the underlying technology that forms the foundation for the suite of waveforms. Traditional tactical military networks cannot provide effective communications-on-the move as they suffer significant, periodic outages and severely limit tactical operations. These networks rely on fragile Link State Routing (LSR) approaches inspired by the Layer-3 routing originally developed for static wired networks, not for dynamic mobile conditions. These LSR routing technologies require large amounts of network overhead for forming and maintaining routes under dynamic operating conditions.

The described suite of waveforms is based on BRn's innovative flat network technology that combines Layers 1 and Layer 2 to create a highly mobile, robust, low overhead, scalable network. BRn leverages the broadcast nature of RF and provides physical layer collaborative combining to enable multiple, simultaneous, redundant, spatially diverse paths between individual nodes within the network. BRn combines this technique with Layer 2 flooding where every node relays the information using efficient spatial pipelining techniques to maintain network efficiency. This approach reduces the network impact of bursty links resulting from high mobility and thus enables highly resilient communications on-the-move.

Barrage Relay networking, and some of its operational aspects, are described in further detail in the following patents: U.S. Pat. Nos. 8,588,126, 8,964,629, 8,457,005, 8,964,773, 8,576,946, 8,897,158, 8,873,391, 9,054,822, and 9,629,063, the disclosures of which are hereby incorporated by reference herein in their entirety. In an example, the TDMA protocol described in disclosed embodiments may employ Barrage Relay networking.

In some embodiments, the described SDCN radio algorithms and waveforms can be configured to operate in conjunction with Periodic Interference Excision (PIE) algorithms, which autonomously identify a periodic interference signal and extract it from the tactical waveform to enable un-interrupted communications. Unlike other interference excision techniques, PIE does not require a reference signal to be able to excise the interference. Details regarding the PIE algorithms are described in U.S. Pat. Nos. 9,543,994 and 9,749,006, the disclosures of which are hereby incorporated by reference herein in their entirety.

In the above-described embodiments, dynamic spectrum access (DSA) enables an effective network wide frequency change when interference is detected. DSA includes distributed, passive in-band and out-of-band RF sensing, a policy engine based on cognitive inferencing algorithms, and protocols that enable the network to autonomously change frequencies as well as search and recover networked nodes when the frequency is changed. Further details regarding DSA are described in PCT/US2022/034688, the disclosure of which is hereby incorporated by reference herein in its entirety.

In some embodiments, the described cognitive radio waveforms (e.g., P and A waveforms) can be configured to perform distributed beamforming, which enables a local set of nodes to collaboratively beamform to reach a long-range destination without the added burden of high-power amplifiers or cumbersome antenna configurations. Further details regarding distributed beamforming are described in U.S. Pat. No. 10,931,350, the disclosure of which is hereby incorporated by reference herein in its entirety.

In some embodiments, the cognitive radio waveforms include a spread spectrum (SS) waveform that provides additional link level resilience over wideband waveforms to ensure optimal performance in contested environments. This SS waveform supports multi-channel voice, PLI and chat for effective operations in restricted environments.

In some embodiments, the SS waveform can be configured to support additional spreading and featureless operation. These capabilities combine to effectively enable operations in restrictive environments to defeat radiometric, high order cyclostationary and subspace (MUSIC, etc.) detection methods. This waveform also incorporates Spectrum Obfuscation (SO) DSA where sensing is used in conjunction with the inferencing engine to identify signals suitable for this waveform to effectively "hide" within.

In some embodiments, the cognitive radio waveforms include a Barrage Relay control channel (BRcc) waveform, which includes SS as well as active channel sensing. This unique capability enables a highly resilient control channel that actively senses the data channel RF environment and provides an omniscient view of the network. The control channel informs the data channel of the network topology and RF operating characteristics to enhance data channel network resiliency. BRcc provides additional data capacity for the communicating data channel control information as well as critical network voice and PLI traffic.

The described SDCN radio waveforms operate within the SDCN architecture in both single and two-channel software-defined radio architectures. In the single channel configuration, the SDCN capability passively senses the RF environment and determines which action to take depending on a permissive, semi-permissive or restricted operational environment. For example, in a single channel configuration in a semi-permissive environment SDCN may enact a standard DSA approach that simply changes frequencies to mitigate unintentional interference in a congested environment. In a contested environment, SDCN may load a highly resilient waveform and operate in an advantaged RF frequency band for reliable operations in a restricted environment. In a two-channel software-defined radio SDCN can leverage BRcc combined with a wideband data channel to autonomously enable enhanced operations across the spectrum of permissive, semi-permissive and restricted operational environments.

The described SDCN radio waveforms provide, amongst other features, the following benefits:

Communications on-the-move. The described cognitive radio waveforms incorporate BRn, the flat network approach that provides physical layer collaborative combining to enable multiple, simultaneous, redundant, spatially diverse paths between individual nodes within the network. This ensure network connectivity is maintained in highly dynamic on-the-move environments. In addition, the cognitive radio waveforms are configured to operate at both tactical mobile ground speeds as well as support for airborne platforms.

RF interference response. The described embodiments provide distinct responses for RF interference response depending on whether operations are in congested or contested environments. In congested environments where the interference is not intentional, mitigation techniques that rely on parameter changes, such as operating frequency or bandwidth can be effectively applied. However, when interference occurs in a contested peer threat environment, more advanced techniques are required.

For example, when operating in congested (permissive or semi-permissive) environments, wherein the P wideband waveform is ideally suited, a DSA interference response is used to effectively mitigate interference and maintain effective network operations. The DSA approach combines sensing with the cognitive algorithms to determine the optimal interference mitigation approach, such as a coordinated network frequency jump to move the network to an alternate frequency. Additional DSA protocols enable nodes that are out of network when the frequency jump occurs to re-join the network at the new frequency.

When operating in contested (restricted) environments, the sensing combined with the SDCN algorithms determine that the interference is intentional and will have the network switch to a more resilient waveform, such as the A waveform of the SS waveform, that has built-in electronic counter-countermeasures (ECCM) capabilities to mitigate intentional peer threat interference.

Waveform adaptability. The described cognitive radio waveforms have built-in mechanisms that automatically adapt to mitigate interference. For example, the multi-mode PHY layer adapts throughput ranging from 0.1 Mbps to 50 Mbps in 1-40 MHz instantaneous bandwidths. Another example is the P waveform with DSA that enables the network to automatically adapt to a new frequency if interference from congestion is detected.

6 EXAMPLE EMBODIMENTS OF THE DISCLOSED TECHNOLOGY

FIG. 13 is a flowchart of an example method 1300 of wireless communication. The method 1300 includes performing, by a first node of a plurality of nodes, a plurality of network interference measurements to generate a first local interference model (1310), receiving, from a second node of the plurality of nodes, a second local interference model (1320), combining the first local interference model and the second local interference model to generate a joint interference model (1330), generating, based on the joint interference model, a plurality of interference parameters (1340), wherein the plurality of interference parameters characterize a communication channel between the first node and the second node, selecting, based on the plurality of interference parameters, an operating waveform from a plurality of waveforms such that a performance metric for a data communication between the first node to the second node exceeds a threshold (1350), and performing, using the operating waveform, the data communication (1360).

In some embodiments, the local interference model can be generated as described in Section 3 and FIG. 4, and the joint interference model (also denoted as the network interference model) can be generated as described in Section 3 and FIG. 5.

In some embodiments, method 1300 may be implemented between a set of first nodes and a set of second nodes (instead of a single first node and a single second node).

In some embodiments, the first local interference model is generated over a plurality of sensing epochs and a plurality of frequency bands. In an example, the plurality of sensing epochs and plurality of frequency bands may be defined by a time division multiple access (TDMA) protocol that is used by each of the nodes in the plurality of nodes.

In some embodiments, the method 1300 further includes transmitting, from the first node to at least one of the plurality of nodes, the first local interference model.

In some embodiments, the performance metric is a message completion rate (MCR), a signal to noise ratio (SNR), a signal to interference plus noise ratio (SINR), a bit error rate (BER), a packet error rate (PER), or a reliability score. As discussed above, this performance metric may be determined by the decision engine (e.g., DE 320 in FIG. 3) based on abstracted features that were determined using the available observables.

In some embodiments, the method 1300 further includes receiving, by the first node, a network radio frequency (RF) topology associated with a connectivity of the plurality of nodes, and wherein selecting the operating waveform is further based on the network RF topology. In an example, the network RF topology is a bidirectional weighted graph that is representative of the bidirectional fidelity of the communication links between pairs of nodes.

In some embodiments, the plurality of waveforms comprises a resilient wideband waveform and a robust narrowband spread spectrum waveform. Herein, the bandwidth of the waveform (e.g., wideband waveform and narrowband waveform) refers to the information bandwidth of the waveforms relative to each other.

In some embodiments, each of the plurality of waveforms is configured based on an operating frequency, an instantaneous RF bandwidth availability, an information bandwidth, a modulation type, and an encoding redundancy (e.g., the error correcting code used).

In some embodiments, the method 1300 further includes determining, subsequent to the data communication, that at least one of the plurality of interference parameters has changed, selecting, based on the at least one of the plurality of interference parameters, another operating waveform different from the operating waveform, performing a state transfer operation between the operating waveform and the another operating waveform, wherein the state transfer operation comprises updating at least one parameter of the another operating waveform based on a topology of the plurality of nodes, at least one error rate indicative of the data communication, or a noise level associated with the communication channel, and performing, using the another operating waveform, another data communication. As discussed previously, implementing the state transfer mechanism reduces the data outage of the system.

In some embodiments, the method 1300 further includes determining, subsequent to the data communication, that an interference environment type has changed, selecting, subsequent to the determining, another operating waveform different from the operating waveform, and performing, using the another operating waveform, another data communication. In an example, the interference environment type may be an in-band jamming level, and a change may correspond to an increase in magnitude (dB increase) or type (e.g., the jamming signal switching from a periodic interferer to a wideband interferer).

In some embodiments, the method 1300 further includes determining, based on the plurality of interference parameters, the performance metric for each of the plurality of waveforms using a machine learning (ML) model. In an example, the ML model may be trained used an offline training operation that includes generating a plurality of candidate topologies, each of the plurality of candidate topologies comprising a number of layers of the ML model, a number of nodes in each of the number of layers, and a connectivity between the number of nodes between each of the number of layers, and determining, for each of the plurality of candidate topologies, a training time to achieve a test error rate for the ML model, wherein the determining the performance metric is based on one topology that is selected based on the training time for each of the plurality of candidate topologies.

Figure 14:
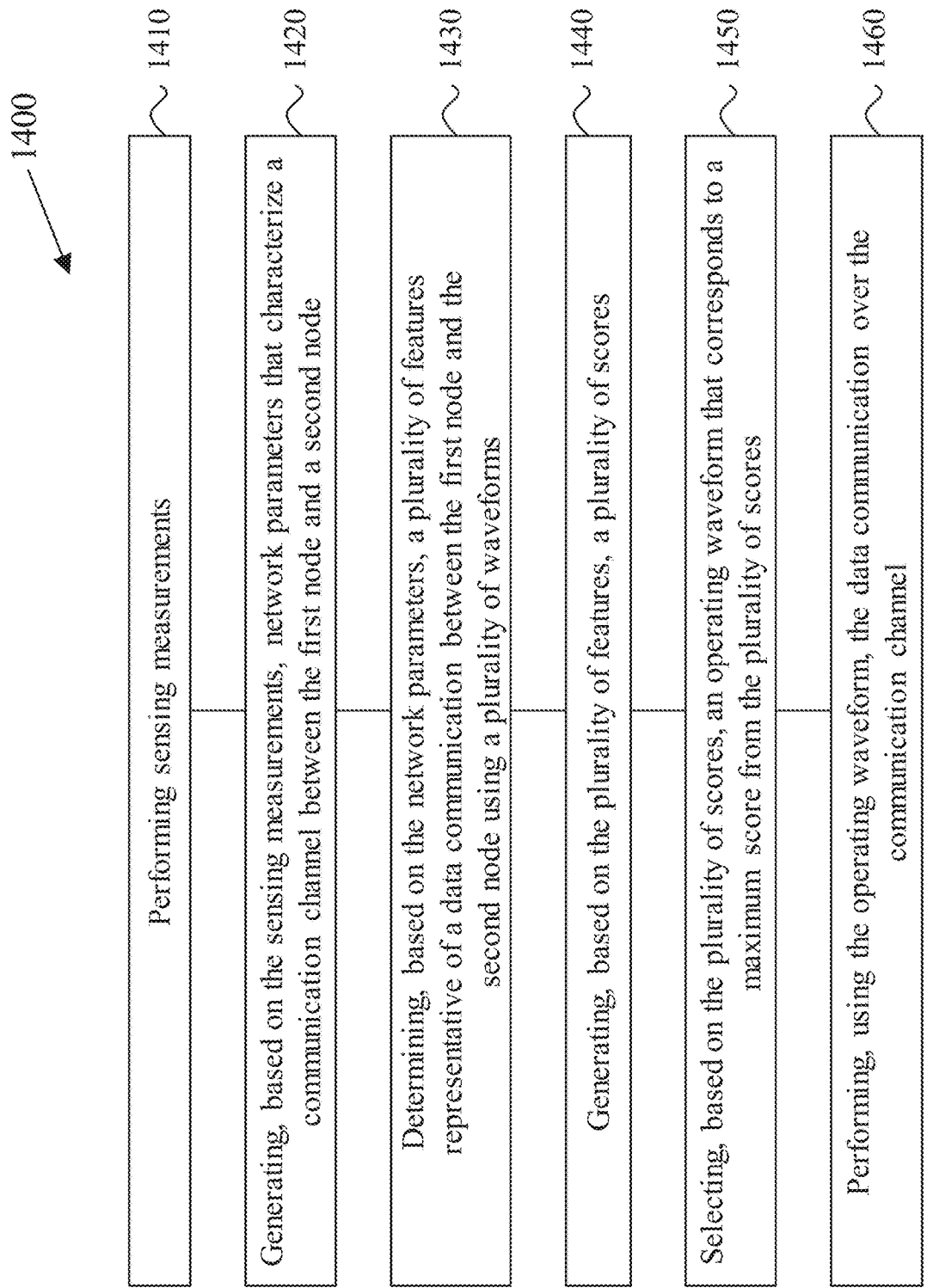

FIG. 14 is a flowchart of an example method 1400 of wireless communication. The method 1400 includes performing a plurality of sensing measurements (1410), generating, based on the plurality of sensing measurements, a plurality of network parameters that characterize a communication channel between the first wireless device and a second wireless device of the plurality of wireless devices (1420), determining, based on the plurality of network parameters, a plurality of features representative of a data communication between the first wireless device and the second wireless device using a plurality of waveforms (1430), generating, based on the plurality of features, a plurality of scores, wherein each of the plurality of scores is associated with a corresponding waveform of the plurality of waveforms (1440), selecting, based on the plurality of scores, an operating waveform from the plurality of waveforms (1450), wherein the operating waveform corresponds to a maximum score from the plurality of scores, and performing, using the operating waveform, the data communication over the communication channel (1460).

In some embodiments, the plurality of sensing measurements are performed over a plurality of sensing epochs and a plurality of frequency bands defined by a TDMA protocol.

In some embodiments, the plurality of network parameters comprise one or more of a data rate, a maximum latency, a security level, a radio frequency (RF) fidelity, a network utilization or congestion metric, or a network connectivity metric, and wherein the plurality of features comprise a data rate feature, a latency feature, a security level feature, a local connectivity feature, a gateway connectivity feature, an interference feature, a weather impact feature, or a battery power feature.

In some embodiments, generating a score for the corresponding waveform includes configuring, based on the plurality of features, a plurality of parameters of a machine learning (ML) model, generating, using the ML model, an initial score for the corresponding waveform, receiving, from one or more of the plurality of wireless devices, at least one error rate indicative of the data communication between the first wireless device and a corresponding wireless device, and generating, using the ML model and the initial score, the score for the corresponding waveform.

In some embodiments, the plurality of parameters comprises a number of layers of the ML model, a number of nodes in each of the number of layers, and a connectivity between the number of nodes between each of the number of layers.

In some embodiments, the at least one error rate comprises a bit error rate (BER) or a packet error rate (PER).

Figure 15:
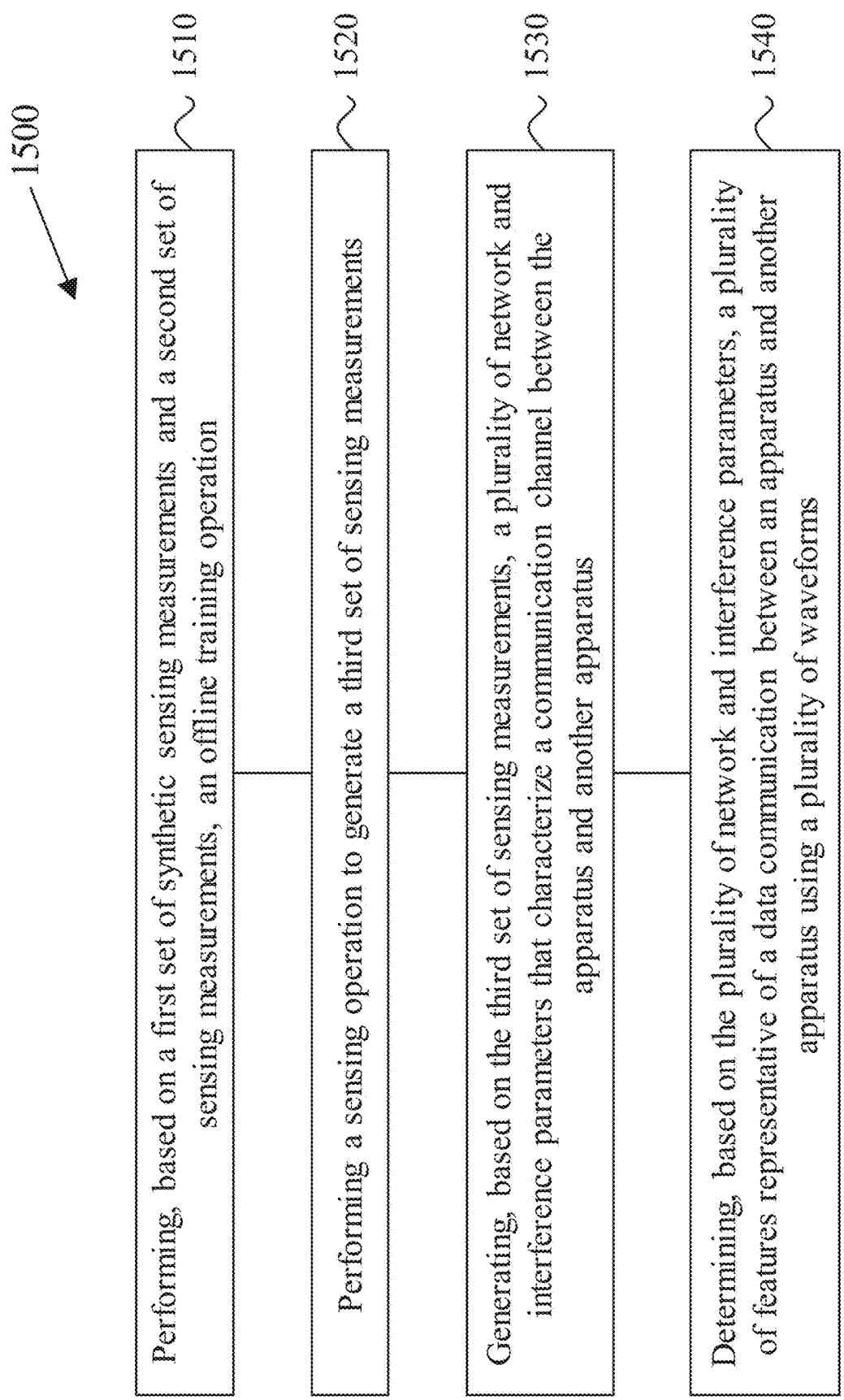
Figure 15:
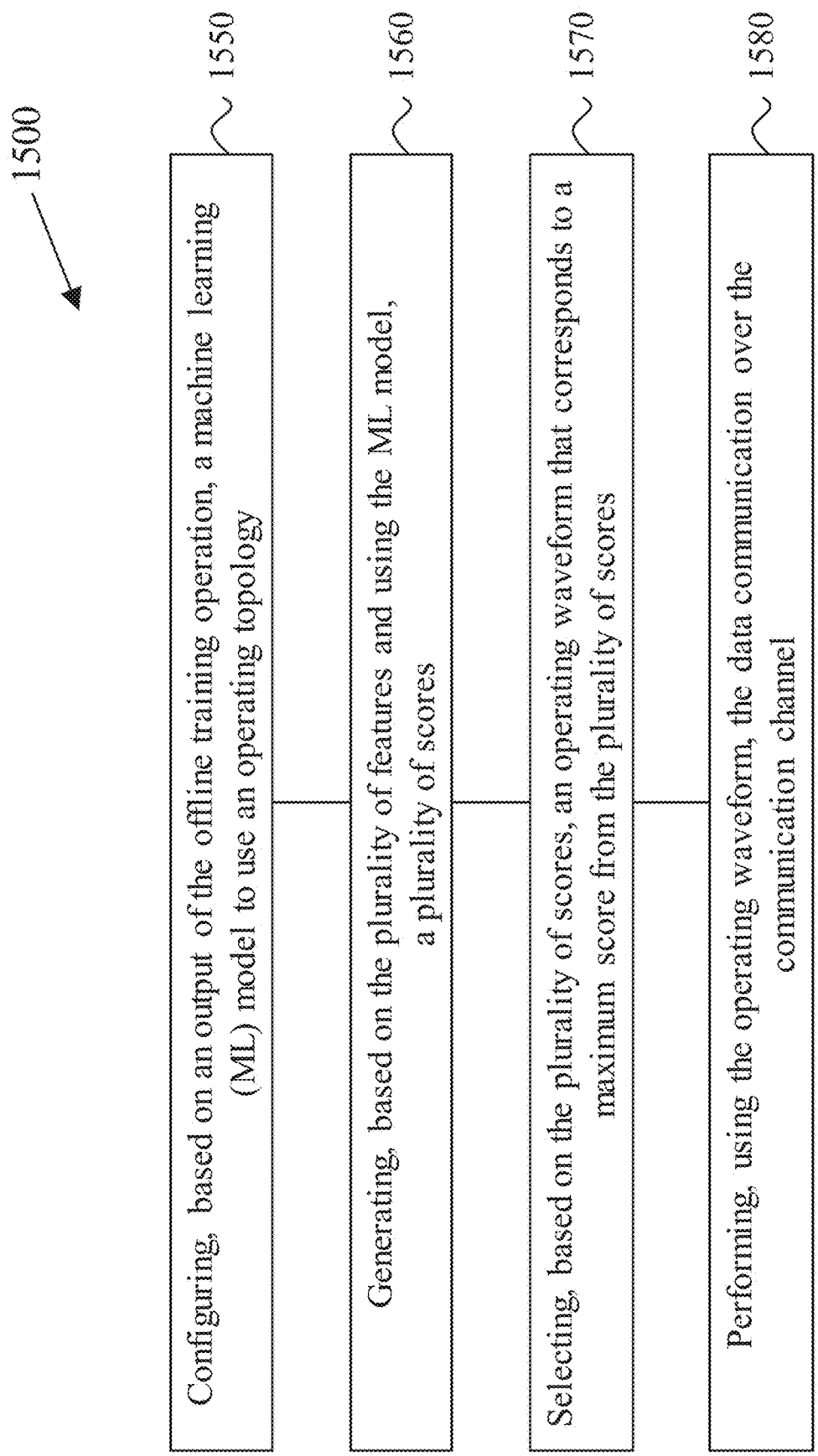

FIG. 15 is a flowchart of an example method 1500 of wireless communication. The method 1500 includes performing, based on the first set of synthetic sensing measurements and the second set of sensing measurements, an offline training operation (1510), performing the sensing operation to generate a third set of sensing measurements (1520), generating, based on the third set of sensing measurements, a plurality of network and interference parameters that characterize a communication channel between the apparatus and another apparatus (1530), determining, based on the plurality of network and interference parameters, a plurality of features representative of a data communication between the apparatus and the another apparatus using a plurality of waveforms (1540), configuring, based on an output of the offline training operation, a machine learning (ML) model to use an operating topology (1550), generating, based on the plurality of features and using the ML model, a plurality of scores (1560), wherein each of the plurality of scores is associated with a corresponding waveform of the plurality of waveforms, and selecting, based on the plurality of scores, an operating waveform from the plurality of waveforms (1570), wherein the operating waveform corresponds to a maximum score from the plurality of scores, and performing, using the operating waveform, the data communication over the communication channel (1580).

In some embodiments, the method 1500 includes generating a first set of synthetic sensing measurements, and performing a sensing operation to generate a second set of sensing measurements, which are used to perform the offline training operation.

In some embodiments, part of performing the offline training operation includes generating a plurality of candidate topologies comprising the operating topology, wherein each of the plurality of candidate topologies comprises a number of layers of the ML model, a number of nodes in each of the number of layers, and a connectivity between the number of nodes between each of the number of layers, and determining, for each of the plurality of candidate topologies, a training time to achieve a test error rate for the ML model, wherein the operating topology is selected based on the training time for each of the plurality of candidate topologies.

In some embodiments, the sensing operation is performed over a plurality of sensing epochs and a plurality of frequency bands defined by the TDMA protocol.

Figure 16:
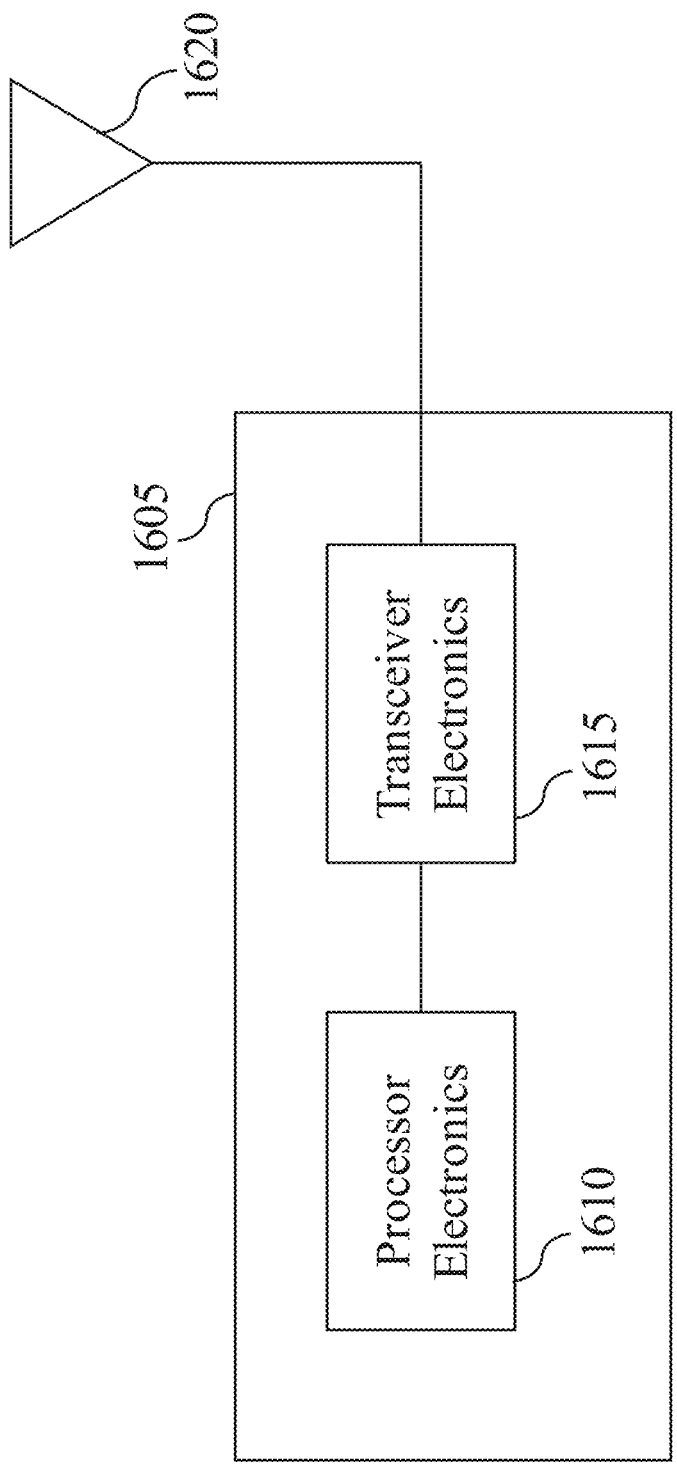
FIG. 16 is a block diagram representation of a portion of an apparatus that may implement a method or technique described in this patent document.

FIG. 16 is a block diagram representation of a portion of an apparatus, in accordance with some embodiments of the presently disclosed technology. An apparatus 1605 can include processor electronics 1610 such as a microprocessor that implements one or more of the techniques or methods (e.g., methods 1300, 1400 and 1500) presented in this document. The apparatus 1605 can include transceiver electronics 1615 to send and/or receive wireless signals over one or more communication interfaces such as antenna(s) 1620. The apparatus 1605 can include other communication interfaces for transmitting and receiving data. Apparatus 1605 can include one or more memories (not explicitly shown) configured to store information such as data and/or instructions. In some implementations, the processor electronics 1610 can include at least a portion of the transceiver electronics 1615. In some embodiments, at least some of the disclosed techniques, modules or functions are implemented using the apparatus 1605. In other embodiments, the processor electronics 1610 can be configured to implement the SDCN radio algorithm architecture shown in FIG. 1B, 3 or 7, or portions of the SDCN architecture shown in FIGS. 8A, 8B, 10, 11 and 12.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for a wireless communication, comprising:
performing, by a first node of a plurality of nodes, a plurality of network interference measurements to generate a first local interference model;
receiving, from a second node of the plurality of nodes, a second local interference model;
combining the first local interference model and the second local interference model to generate a joint interference model;
generating, based on the joint interference model, a plurality of interference parameters, wherein the plurality of interference parameters characterize a communication channel between the first node and the second node;
selecting, based on the plurality of interference parameters, an operating waveform from a plurality of waveforms such that a performance metric for a data communication between the first node to the second node exceeds a threshold; and
performing, using the operating waveform, the data communication.

2. The method of claim 1, wherein the first local interference model is generated over a plurality of sensing epochs and a plurality of frequency bands.

3. The method of claim 1, further comprising:
transmitting, from the first node to at least one of the plurality of nodes, the first local interference model.

4. The method of claim 1, wherein the performance metric is a message completion rate (MCR), a signal to noise ratio (SNR), a signal to interference plus noise ratio (SINR), a bit error rate (BER), a packet error rate (PER), or a reliability score.

5. The method of claim 1, further comprising:
receiving, by the first node, a network radio frequency (RF) topology associated with a connectivity of the plurality of nodes, and wherein selecting the operating waveform is further based on the network RF topology.

6. The method of claim 1, wherein the plurality of waveforms comprises a resilient wideband waveform and a robust narrowband spread spectrum waveform.

7. The method of claim 1, wherein each of the plurality of waveforms is configured based on an operating frequency, an instantaneous bandwidth availability, a modulation type, and an encoding redundancy.

8. The method of claim 1, further comprising:
determining, subsequent to the data communication, that at least one of the plurality of interference parameters has changed;
selecting, based on the at least one of the plurality of interference parameters, another operating waveform different from the operating waveform;
performing a state transfer operation between the operating waveform and the another operating waveform, wherein the state transfer operation comprises updating at least one parameter of the another operating waveform based on a network radio frequency (RF) topology of the plurality of nodes, at least one error rate indicative of the data communication, or a noise level associated with the communication channel; and
performing, using the another operating waveform, another data communication.

9. The method of claim 1, further comprising:
determining, subsequent to the data communication, that an interference environment type has changed;
selecting, subsequent to the determining, another operating waveform different from the operating waveform; and
performing, using the another operating waveform, another data communication.

10. The method of claim 1, further comprising:
determining, based on the plurality of interference parameters, the performance metric for each of the plurality of waveforms using a machine learning (ML) model.

11. The method of claim 10, further comprising:
performing, prior to the selecting the operating waveform, an offline training operation that includes:
generating a plurality of candidate topologies, each of the plurality of candidate topologies comprising a number of layers of the ML model, a number of nodes in each of the number of layers, and a connectivity between the number of nodes between each of the number of layers; and determining, for each of the plurality of candidate topologies, a training time to achieve a test error rate for the ML model, wherein the determining the performance metric is based on one topology of the plurality of candidate topologies that is selected based on the training time for each of the plurality of candidate topologies.

12. A system for wireless communication, comprising:
a plurality of wireless devices,
wherein each of the plurality of wireless devices is configured to perform communication using a time-division multiple access (TDMA) protocol, and
wherein the plurality of wireless devices comprises a first wireless device configured to:
 perform a plurality of sensing measurements;
 generate, based on the plurality of sensing measurements, a plurality of network parameters that characterize a communication channel between the first wireless device and a second wireless device of the plurality of wireless devices;
 determine, based on the plurality of network parameters, a plurality of features representative of a data communication between the first wireless device and the second wireless device using a plurality of waveforms;
 generate, based on the plurality of features, a plurality of scores, wherein each of the plurality of scores is associated with a corresponding waveform of the plurality of waveforms;
 select, based on the plurality of scores, an operating waveform from the plurality of waveforms, wherein the operating waveform corresponds to a maximum score from the plurality of scores; and
 perform, using the operating waveform, the data communication over the communication channel.

13. The system of claim 12, wherein the plurality of sensing measurements are performed over a plurality of sensing epochs and a plurality of frequency bands defined by the TDMA protocol.

14. The system of claim 12, wherein the plurality of network parameters comprise one or more of a data rate, a maximum latency, a security level, a radio frequency (RF) fidelity, a network utilization or congestion metric, or a network connectivity metric, and wherein the plurality of features comprise a data rate feature, a latency feature, a security level feature, a local connectivity feature, a gateway connectivity feature, an interference feature, a weather impact feature, or a battery power feature.

15. The system of claim 12, wherein the first wireless device is configured, as part of generating a score for the corresponding waveform, to:
 configuring, based on the plurality of features, a plurality of parameters of a machine learning (ML) model;
 generating, using the ML model, an initial score for the corresponding waveform;
 receiving, from one or more of the plurality of wireless devices, at least one error rate indicative of the data communication between the first wireless device and a corresponding wireless device; and
 generating, using the ML model and the initial score, the score for the corresponding waveform.

16. The system of claim 15, wherein the plurality of parameters comprises a number of layers of the ML model, a number of nodes in each of the number of layers, and a connectivity between the number of nodes between each of the number of layers.

17. The system of claim 15, wherein the at least one error rate comprises a bit error rate (BER) or a packet error rate (PER).

18. An apparatus for wireless communication, comprising:
 a processor; and
 a transceiver coupled to the processor,
 wherein the apparatus is configured to perform communication using a time-division multiple access (TDMA) protocol,
 wherein the processor is configured to:
  generate a first set of synthetic sensing measurements;
  perform a sensing operation to generate a second set of sensing measurements;
  perform, based on the first set of synthetic sensing measurements and the second set of sensing measurements, an offline training operation;
  perform the sensing operation to generate a third set of sensing measurements;
  generate, based on the third set of sensing measurements, a plurality of network and interference parameters that characterize a communication channel between the apparatus and another apparatus;
  determine, based on the plurality of network and interference parameters, a plurality of features representative of a data communication between the apparatus and the another apparatus using a plurality of waveforms;
  configure, based on an output of the offline training operation, a machine learning (ML) model to use an operating topology;
  generate, based on the plurality of features and using the ML model, a plurality of scores, wherein each of the plurality of scores is associated with a corresponding waveform of the plurality of waveforms; and
  select, based on the plurality of scores, an operating waveform from the plurality of waveforms, wherein the operating waveform corresponds to a maximum score from the plurality of scores, and
 wherein the transceiver is configured to:
  perform, using the operating waveform, the data communication over the communication channel.

19. The apparatus of claim 18, wherein the processor is further configured, as part of performing the offline training operation, to:
 generate a plurality of candidate topologies comprising the operating topology, wherein each of the plurality of candidate topologies comprises a number of layers of the ML model, a number of nodes in each of the number of layers, and a connectivity between the number of nodes between each of the number of layers; and
 determine, for each of the plurality of candidate topologies, a training time to achieve a test error rate for the ML model,
 wherein the operating topology is selected based on the training time for each of the plurality of candidate topologies.

20. The apparatus of claim 18, wherein the sensing operation is performed over a plurality of sensing epochs and a plurality of frequency bands defined by the TDMA protocol.

* * * * *